(12) United States Patent
Kuang et al.

(10) Patent No.: US 11,659,618 B2
(45) Date of Patent: *May 23, 2023

(54) BANDWIDTH PART ADAPTATION IN DOWNLINK COMMUNICATIONS

(71) Applicant: Panasonic Intellectual Property Corporation of America, Torrance, CA (US)

(72) Inventors: Quan Kuang, Langen (DE); Hidetoshi Suzuki, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/579,493

(22) Filed: Jan. 19, 2022

(65) Prior Publication Data

US 2022/0151016 A1    May 12, 2022

Related U.S. Application Data

(63) Continuation of application No. 16/786,746, filed on Feb. 10, 2020, now Pat. No. 11,265,961, which is a
(Continued)

(30) Foreign Application Priority Data

Aug. 11, 2017   (EP) ..................................... 17186074

(51) Int. Cl.
    *H04W 76/28* (2018.01)
    *H04W 76/27* (2018.01)
    (Continued)

(52) U.S. Cl.
    CPC ........... *H04W 76/28* (2018.02); *H04L 5/0007* (2013.01); *H04L 5/0053* (2013.01);
    (Continued)

(58) Field of Classification Search
    CPC .............................. H04W 76/28; H04W 76/27
    (Continued)

(56) References Cited

U.S. PATENT DOCUMENTS

2015/0063244 A1   3/2015  Wang et al.
2015/0341978 A1   11/2015 Rune
(Continued)

FOREIGN PATENT DOCUMENTS

CN    102273250 A    12/2011
CN    107005386 A    8/2017
(Continued)

OTHER PUBLICATIONS

Chinese Office Action, dated Dec. 23, 2021, for Chinese application No. 201880052155.6, 17 pages. (with English translation).
(Continued)

*Primary Examiner* — Angel T Brockman
(74) *Attorney, Agent, or Firm* — Seed IP Law Group LLP

(57) ABSTRACT

The present disclosure relates to a mobile terminal, a base station, an operating method for a mobile terminal and an operating method for a base station. The mobile terminal is for communicating in a mobile communication system with a base station using at least one of a first bandwidth part, BP1, and a second bandwidth part, BP2. Both, the first and second bandwidth part BP1 and BP2 are within a system bandwidth, wherein the first bandwidth part, BP1, is smaller than the second bandwidth part, BP2. The mobile terminal comprises a transceiver which, in operation, receives a configuration of a discontinuous reception, DRX, cycle. Further, the mobile terminal comprises a processor which, in operation, configures, upon reception of the configuration of the DRX cycle, the a downlink communication during at least one of the communication periods within the DRX cycle to use a specific one of at least the first bandwidth part, BP1, and the second bandwidth part, BP2.

28 Claims, 11 Drawing Sheets

Related U.S. Application Data continuation of application No. PCT/EP2018/071653, filed on Aug. 9, 2018.

(51) Int. Cl.
  *H04W 72/23* (2023.01)
  *H04L 5/00* (2006.01)
  *H04W 72/0453* (2023.01)

(52) U.S. Cl.
  CPC ....... *H04W 72/0453* (2013.01); *H04W 72/23* (2023.01); *H04W 76/27* (2018.02)

(58) Field of Classification Search
  USPC .......................................................... 370/329
  See application file for complete search history.

(56) References Cited

U.S. PATENT DOCUMENTS

| 2019/0253137 A1* | 8/2019 | Sun ..................... H04B 7/2643 |
| 2020/0145882 A1 | 5/2020 | Zhang |
| 2021/0014791 A1 | 1/2021 | Freda et al. |

FOREIGN PATENT DOCUMENTS

| EP | 3142283 A1 | 3/2017 |
| JP | 2015502089 A | 1/2015 |
| JP | 2016506138 A | 2/2016 |
| RU | 2498537 C2 | 11/2013 |
| WO | 2014/000174 A1 | 1/2014 |
| WO | WO 2015147593 | 10/2015 |
| WO | 2016/163665 A1 | 10/2016 |
| WO | WO 2016164202 | 10/2016 |

OTHER PUBLICATIONS

English Translation of Japanese Office Action, dated Oct. 4, 2022, for Japanese Patent Application No. 2020-503744. (5 pages).

Guangdong OPPO Mobile Telecom, "Discussion on UE specific RF bandwidth adaptation in NR," R1-1710172, Agenda Item: 5.1.7, 3GPP TSG RAN WG1 NR Ad-Hoc#2, Qingdao, China, Jun. 27-30, 2017, 3 pages.

Guangdong OPPO Mobile Telecom, "Discussion on UE specific RF bandwidth adaptation in NR," R1-1707727, Agenda Item: 7.1.7, 3GPP TSG RAN WG1 Meeting 89, Hangzhou, China, May 15-19, 2017, 2 pages.

InterDigital Inc., "Bandwidth Adaptation via BWP Selection in NR," Agenda Item: 5.1.7, R1-1710878, 3GPP TSG RAN WG1 NR Ad-Hoc #2, Qingdao, China, Jun. 27-30, 2017, 3 pages.

3GPP TR 38.801 V2.0.0, "3rd Generation Partnership Project; Technical Specification Group Radio Access Network; Study on New Radio Access Technology; Radio Access Architecture and Interfaces (Release 14)," Mar. 2017, 90 pages.

3GPP TR 38.913 V14.1.0, "3rd Generation Partnership Project; Technical Specification Group Radio Access Network; Study on Scenarios and Requirements for Next Generation Access Technologies; (Release 14)," Dec. 2016, 38 pages.

Extended European Search Report, dated Jan. 31, 2018, for corresponding European Application No. 17186074.5-1219, 8 pages.

International Search Report, dated Oct. 9, 2018, for corresponding International Application No. PCT/EP2018/071653, 2 pages.

Guangdong OPPO Mobile Telecom, "Discussion on UE specific RF bandwidth adaptation in NR," R1-1707727, Agenda Item: 7.1.7, 3GPP TSG RAN WG1 Meeting 89, Hangzhou, P.R. China, May 15-19, 2017. (2 pages).

Guangdong OPPO Mobile Telecom, "Discussion on UE specific RF bandwidth adaptation in NR," R1-1710172, Agenda Item: 5.1.7, 3GPP TSG RAN WG1 NR Ad-Hoc#2, Qingdau, P.R. China, Jun. 27-30, 2017. (3 pages).

InterDigital Inc., "Bandwidth Adaptation in NR," R1-1708998, Agenda Item: 7.1.7, 3GPP TSG RAN WG1 Meeting #89, Hangzhou, China, May 15-19, 2017. (3 pages).

Interdigital, Inc., "Bandwidth Adaptation via BWP Selection in NR," R1-1710878, Agenda Item: 5.1.7, 3GPP TSG RAN WG1 NR Ad-Hoc #2, Qingdao, China, Jun. 27-30, 2017. (3 pages).

LG Electronics, "Discussion on Bandwidth Part Configurations," R1-1711574, Agenda Item: 5.1.11, 3GPP TSG RAN WG1 Meeting Ad-Hoc, Qingdao, P.R. China, Jun. 27-30, 2017. (5 pages).

Samsung, "Cross-link interference management based on UE measurements," R1-1710754, Agenda item: 5.1.6.1, 3GPP TSG RAN WG1 NR Ad-Hoc#2, Qingdao, China, Jun. 27-30, 2017. (4 pages).

Samsung, "Wider Bandwidth Operations," R1-1710761, Agenda item: 5.1.7, 3GPP TSG RAN WG1 NR Ad-Hoc#2, Qingdao, P.R. China, Jun. 27-30, 2017. (8 pages).

Colombian Office Action, dated Nov. 28, 2022, for Colombian Patent Application No. NC2020/0001172 (13 pages).

* cited by examiner

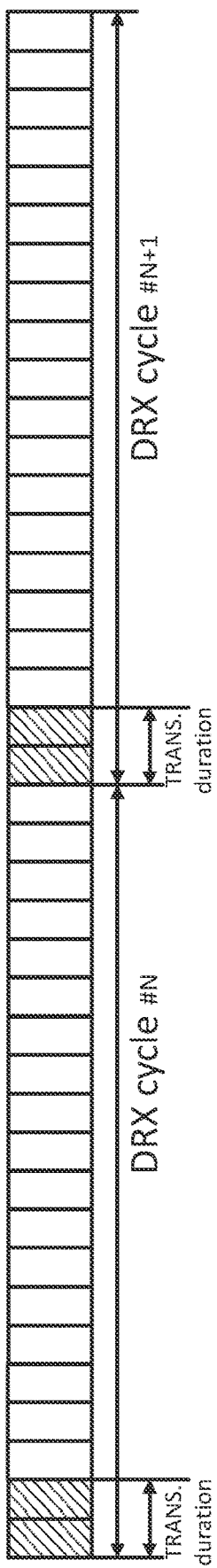
Fig. 1a
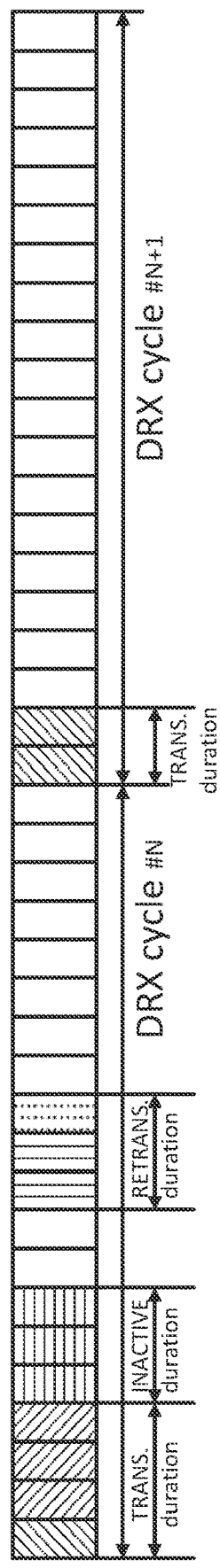
Fig. 1b
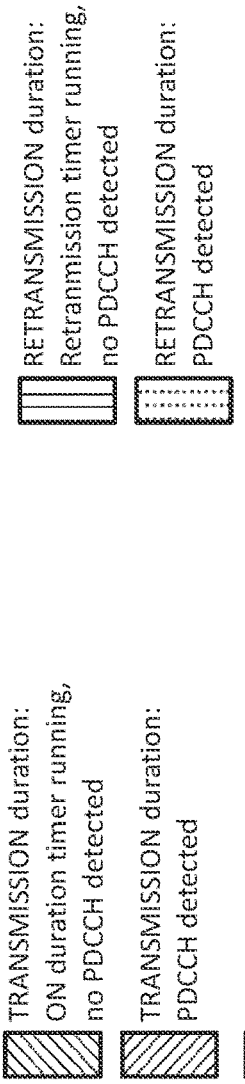

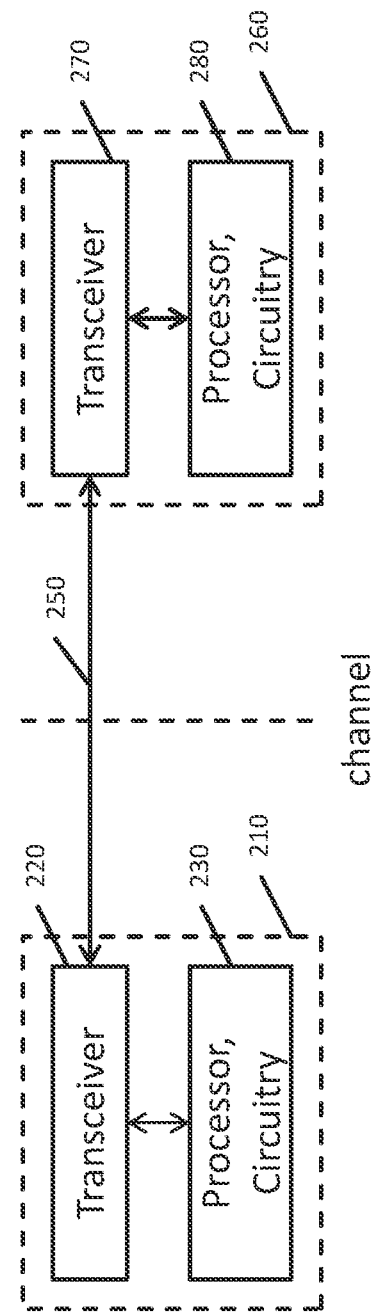

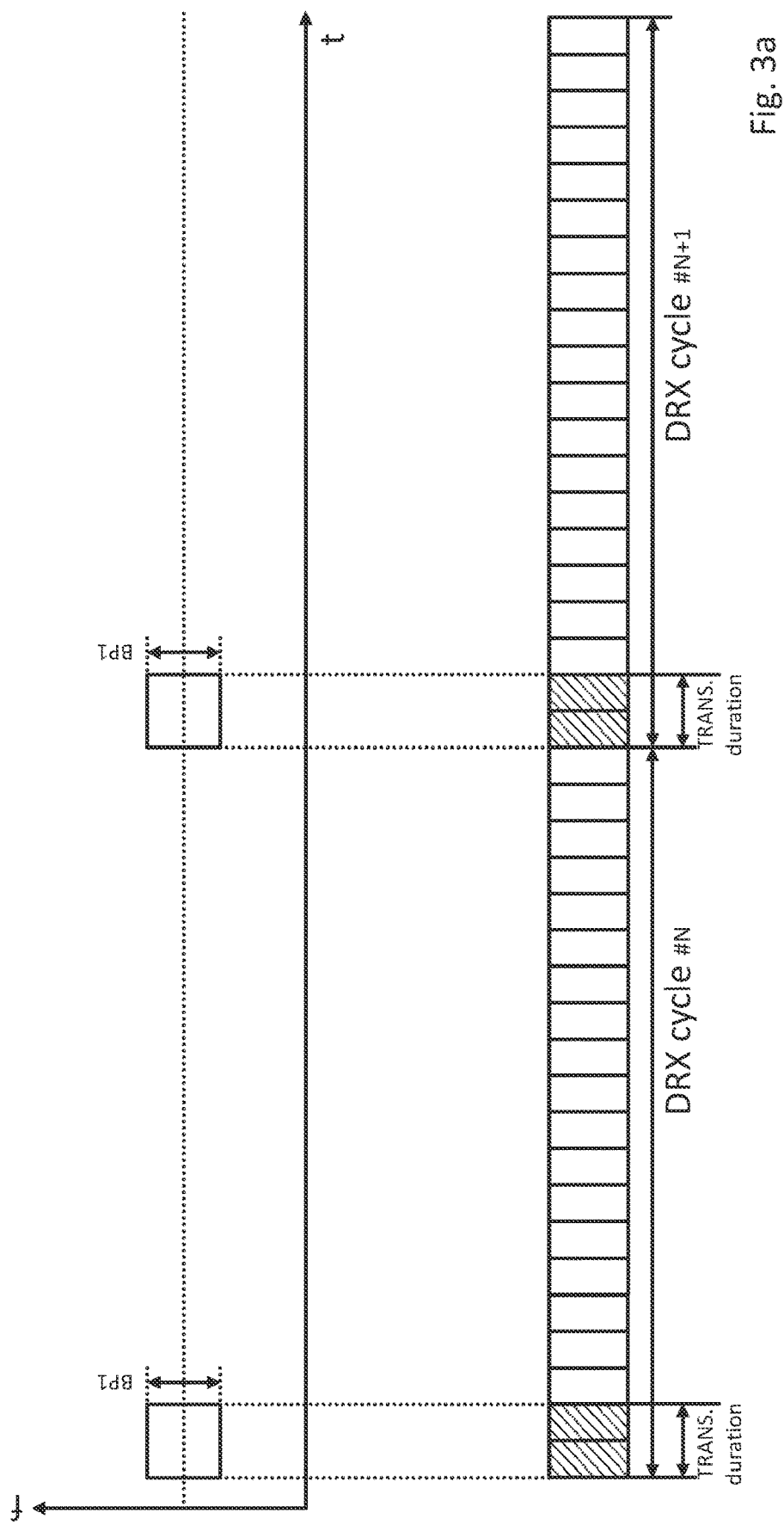

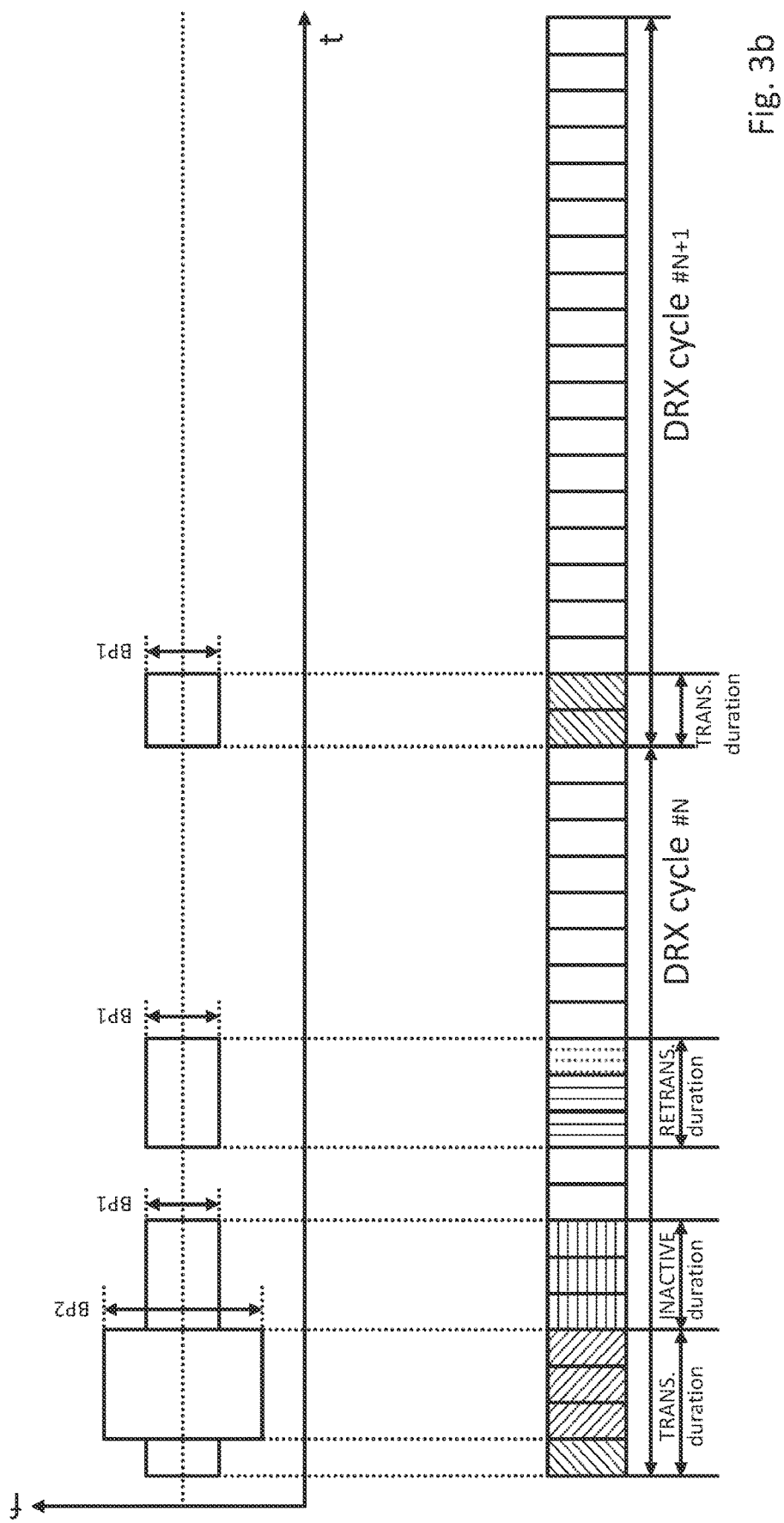

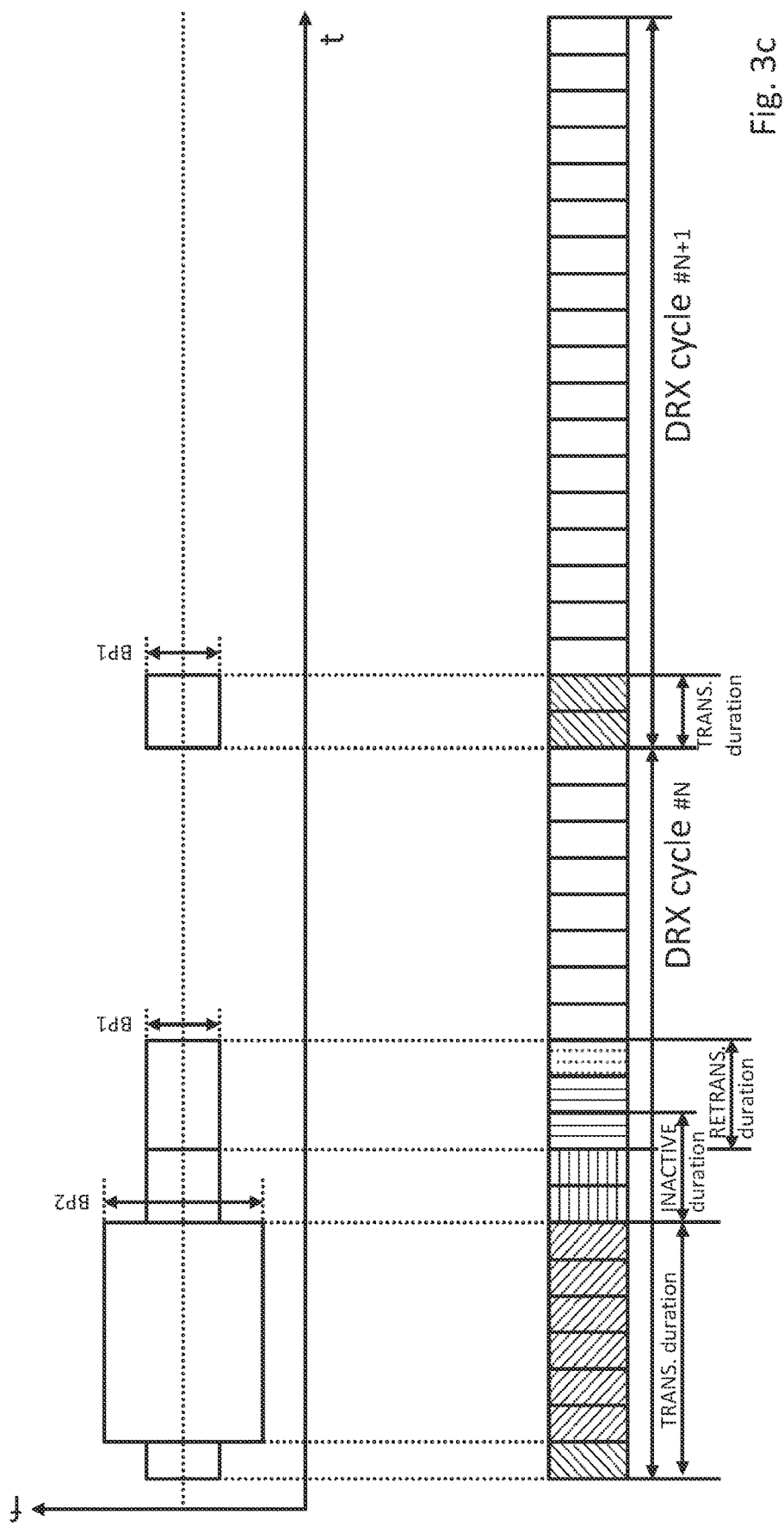

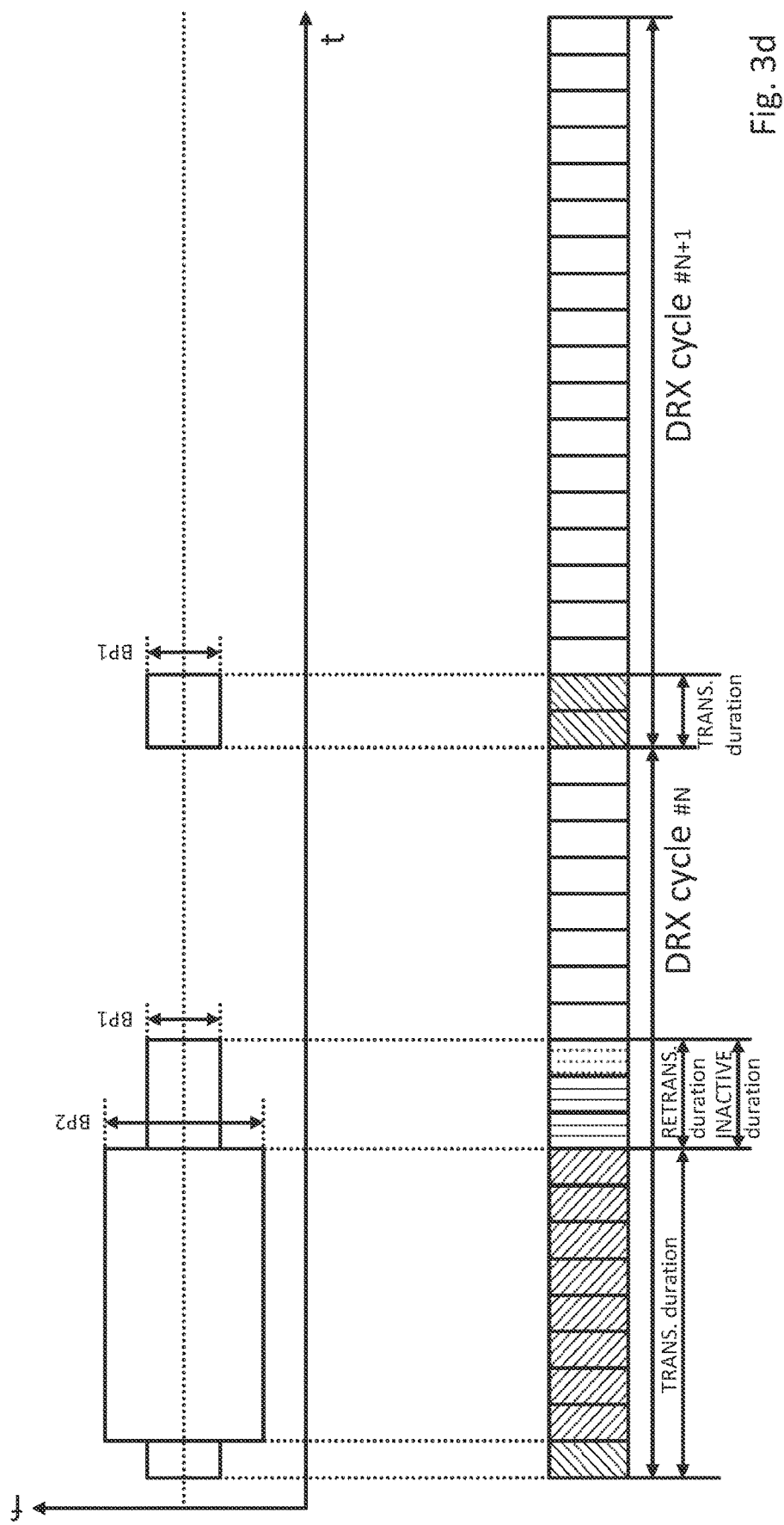

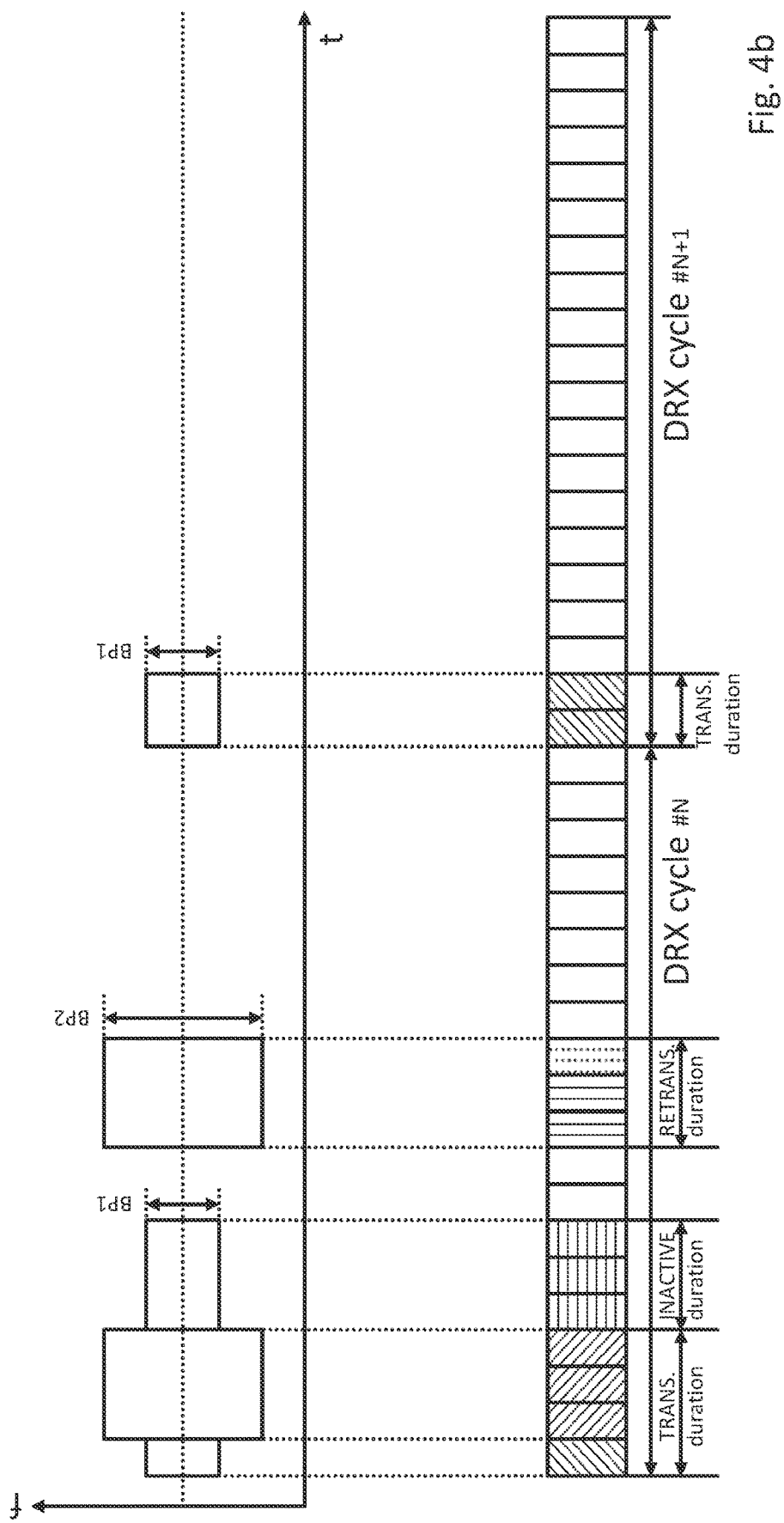

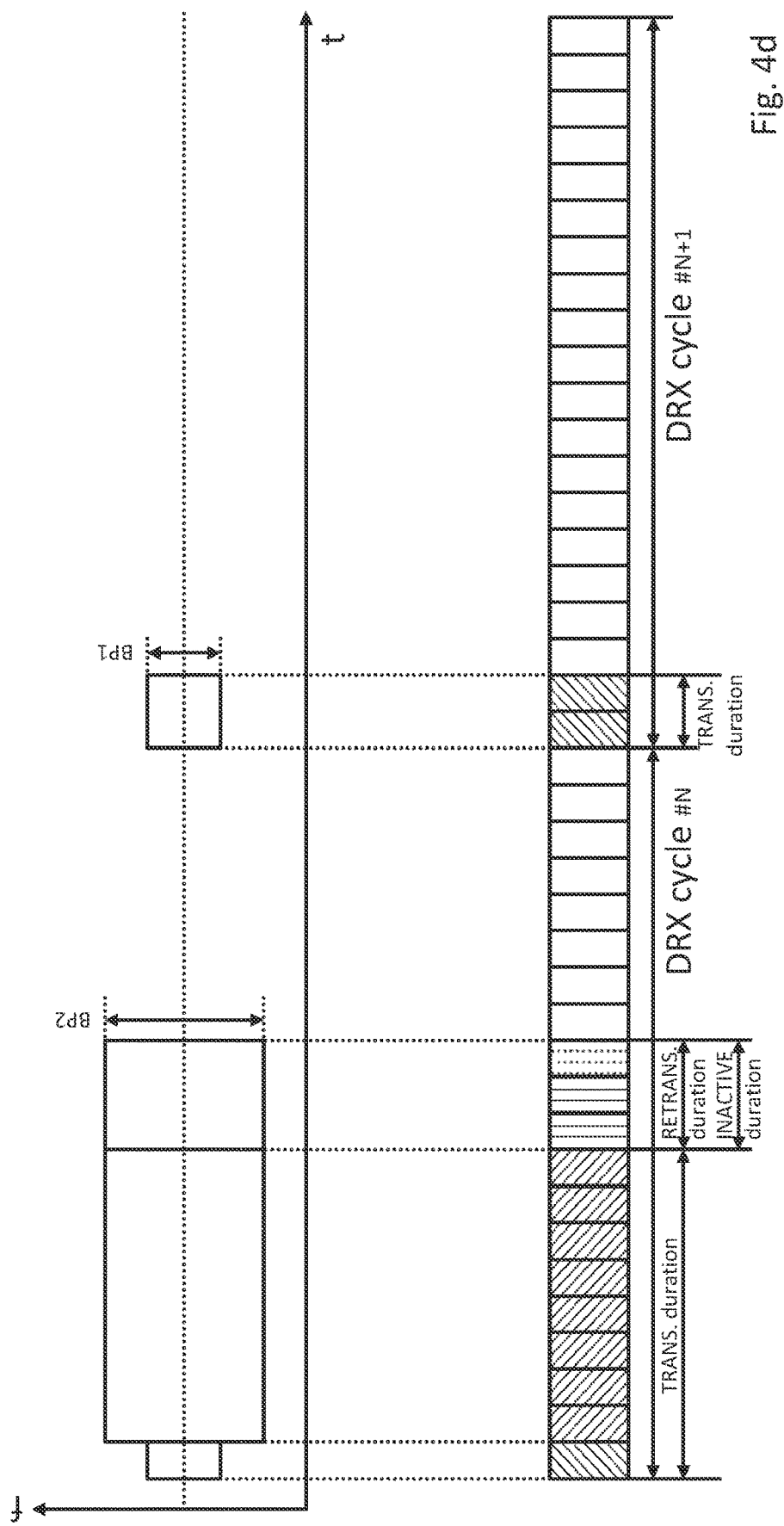

BANDWIDTH PART ADAPTATION IN DOWNLINK COMMUNICATIONS

BACKGROUND

Technical Field

The present disclosure relates to the adaptation of bandwidth parts in a mobile communication system to be utilized in combination with discontinuous reception for downlink communications between a mobile terminal and a base station.

Description of the Related Art

Currently, the $3^{rd}$ Generation Partnership Project (3GPP) focuses on the next release (Release 15) of technical specifications for the next generation cellular technology, which is also called fifth generation (5G).

At the 3GPP Technical Specification Group (TSG) Radio Access network (RAN) meeting #71 (Gothenburg, March 2016), the first 5G study item, "*Study on New Radio Access Technology*" involving RAN1, RAN2, RAN3 and RAN4 was approved and is expected to become the Release 15 work item (WI) which will defines the first 5G standard.

One objective of 5G new radio (NR) is to provide a single technical framework addressing all usage scenarios, requirements and deployment scenarios defined in 3GPP TSG RAN TR 38.913 v14.1.0, "*Study on Scenarios and Requirements for Next Generation Access Technologies*", December 2016 (available at www.3gpp.org and incorporated herein in its entirety by reference), at least including enhanced mobile broadband (eMBB), ultra-reliable low-latency communications (URLLC), massive machine type communication (mMTC).

For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include the scenarios with large number of devices with non-time critical data transfers such as smart wearables and sensor networks.

Another objective is the forward compatibility, anticipating future use cases/deployment scenarios. The backward compatibility to Long Term Evolution (LTE) is not required, which facilitates a completely new system design and/or the introduction of novel features.

As summarized in one of the technical reports for the NR study item (3GPP TSG TR 38.801 v2.0.0, "*Study on New Radio Access Technology; Radio Access Architecture and Interfaces*", March 2017), the fundamental physical layer signal waveform will be based on Orthogonal Frequency Division Multiplexing (OFDM). For both downlink and uplink, OFDM with cyclic prefix (CP-OFDM) based waveform is supported. Discrete Fourier Transformation (DFT) spread OFDM (DFT-S-OFDM) based waveform is also supported, complementary to CP-OFDM waveform at least for eMBB uplink for up to 40 GHz.

One of the design targets in NR is to utilize the fundamental physical layer signal waveform in communications while reducing the overall power consumption. For this purpose it was agreed in the 3GPP RAN2 NR AdHoc #2 meeting in Qingdao, China on 27-29 Jun. 2017 to apply mechanisms similar to discontinuous reception (DRX) in LTE in the downlink as a baseline design.

The term "downlink" refers to communication from a higher node to a lower node (e.g., from a base station to a relay node or to a UE, from a relay node to a UE, or the like). The term "uplink" refers to communication from a lower node to the higher node (e.g., from a UE to a relay node or to a base station, from a relay node to a base station, or the like). The term "sidelink" refers to communication between nodes at the same level (e.g., between two UEs, or between two relay nodes, or between two base stations).

BRIEF SUMMARY

One non-limiting and exemplary embodiment facilitates adaptation of bandwidth parts in a mobile communication system to be utilized in combination with discontinuous reception for downlink communications between a mobile terminal and a base station.

In one general aspect, the techniques disclosed here feature, a mobile terminal for communicating in a mobile communication system with a base station using at least one of a first bandwidth part, BP1, and a second bandwidth part, BP2. Both, the first and second bandwidth part BP1 and BP2 are within a system bandwidth, wherein the first bandwidth part, BP1, is smaller than the second bandwidth part, BP2. The mobile terminal comprises a transceiver which, in operation, receives a configuration of a discontinuous reception, DRX, cycle. Further, the mobile terminal comprises a processor which, in operation, configures, upon reception of the configuration of the DRX cycle, the a downlink communication during at least one of the communication periods within the DRX cycle to use a specific one of at least the first bandwidth part, BP1, and the second bandwidth part, BP2.

In another general aspect, the techniques disclosed here feature a base station for communicating in a mobile communication system with a mobile terminal, using at least one of a first bandwidth part, BP1, and a second bandwidth part, BP2. Both, the first and second bandwidth part BP1 and BP2 are within a system bandwidth, wherein the first bandwidth part, BP1, is smaller than the second bandwidth part, BP2. The base station comprises a transceiver which, in operation, transmits a configuration of a discontinuous reception, DRX, cycle. Further, the base station comprises a processor which, in operation, configures, upon transmission of the configuration of the DRX cycle, a downlink communication during at least one of the communication periods within the DRX cycle to use a specific one of at least the first bandwidth part, BP1, and the second bandwidth part, BP2.

In a further general aspect, the techniques disclosed here feature an operating method to be performed by a mobile terminal using at least one of a first bandwidth part, BP1, and a second bandwidth part, BP2, within a system bandwidth, the first bandwidth part, BP1, being smaller than the second bandwidth part, BP2. The operating method comprises the steps of receiving a configuration of a discontinuous reception, DRX, cycle; and configuring, upon reception of the configuration of the DRX cycle, a downlink communication during at least one of the communication periods within the DRX cycle to use a specific one of at least the first bandwidth part BP1 and the second bandwidth part BP2.

In yet another general aspect, the techniques disclosed here feature an operating method to be performed by a base station using at least one of a first bandwidth part, BP1, and a second bandwidth part, BP2, within a system bandwidth, the first bandwidth part, BP1, being smaller than the second bandwidth part, BP2. The operating method comprises the steps of transmitting a configuration of a discontinuous reception, DRX, cycle; and configuring, upon transmission of the configuration of the DRX cycle, a downlink communication during at least one of the communication periods within the DRX cycle to use a specific one of at least the first bandwidth part BP1, and the second bandwidth part BP2.

It should be noted that general or specific embodiments may be implemented as a system, a method, an integrated circuit, a computer program, a storage medium, or any selective combination thereof.

Additional benefits and advantages of the disclosed embodiments will be apparent from the specification and Figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

FIGS. 1a-1d are schematic drawings illustrating exemplary communications employing a discontinuous reception mechanism in NR;

FIG. 2 is a block diagram showing the structure of a mobile terminal and a base station;

FIGS. 3a-3d are schematic drawings illustrating one scheme of bandwidth part adaptations in combination with the discontinuous reception mechanism in NR; and FIGS. 4a-4d are schematic drawings illustrating another scheme of bandwidth part adaptations in combination with discontinuous reception mechanism in NR.

DETAILED DESCRIPTION

Figure 4A:
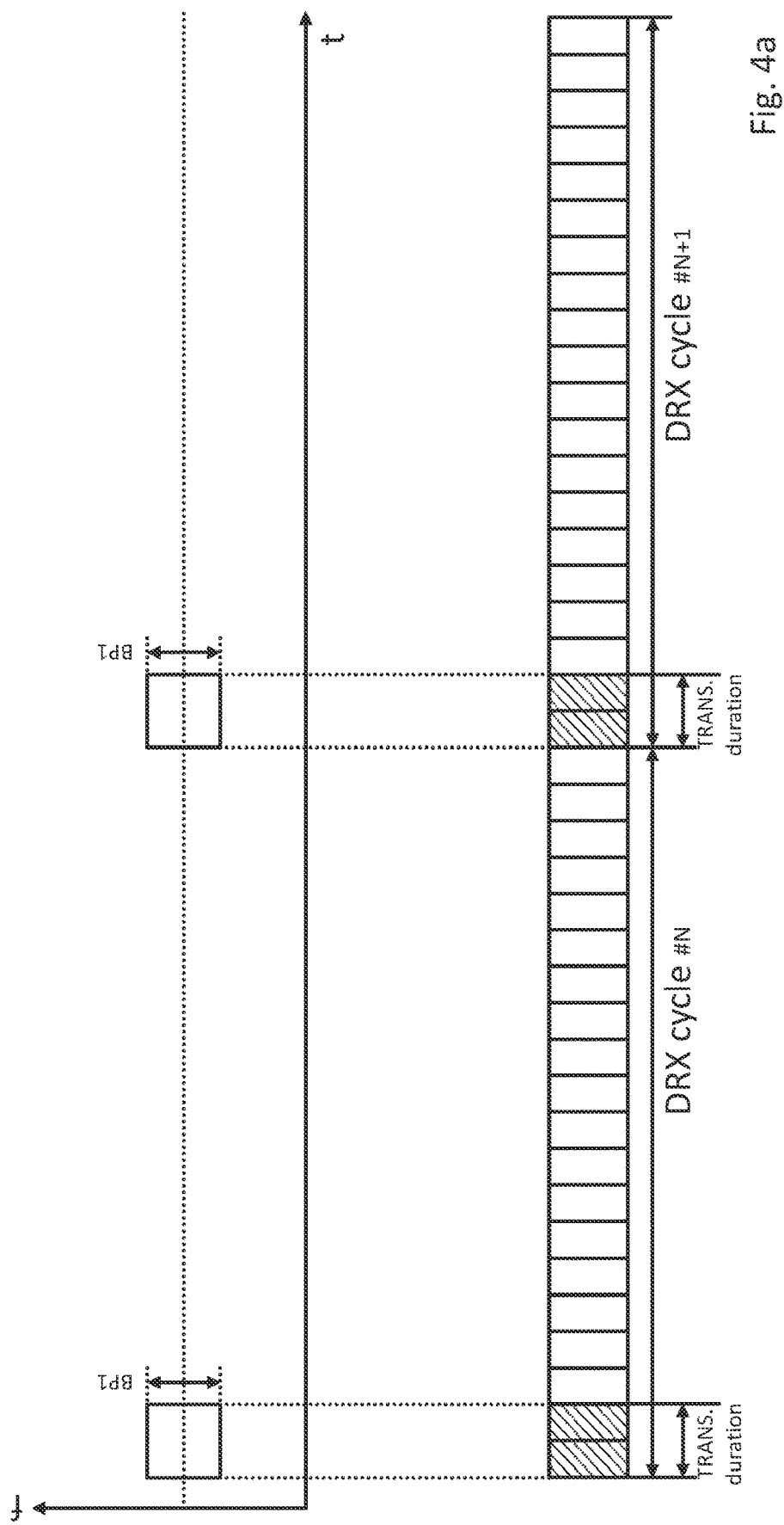

As identified in TR 38.913, the various use cases/deployment scenarios for NR have diverse requirements in terms of data rates, latency, and coverage. With these requirements in mind NR should aim for even further reduced power consumption, as compared with LTE.

In 3GPP RAN1 #86bis, it was agreed to employ a concept of bandwidth adaptation for downlink communications. This concept of bandwidth adaptation envisions the allocation of narrow bandwidth part within the system bandwidth. This bandwidth part shall facilitate the monitoring of downlink control information at reduced power consumption.

Particularly, it was agreed, at least for single carrier operation, that NR should allow a UE to operate in a way where it receives at least downlink control information in a first RF bandwidth and where the UE is not expected to receive in a second RF bandwidth that is larger than the first RF bandwidth within less than X μs (the value of X did remain for further study, FFS).

Aside of this general agreement, it remained for further study whether the first RF bandwidth is within the second RF bandwidth, whether the first RF bandwidth is at the center of the second RF bandwidth; and what the maximum ratio of the first RF bandwidth over the second RF bandwidth can be. The detailed mechanism also remained for further study, as well as how RF bandwidth adaptation works for radio resource management (RRM) measurements.

In 3GPP RAN1 #88bis, it was further agreed that, for single-carrier operation, the UE is not required to receive any DL signals outside a frequency range A which is configured to the UE. The interruption time needed for frequency range change from frequency range A to a frequency range B needs to be defined (TBD). Additionally, the frequency ranges A & B may be different in BW and center frequency in a single carrier operation.

In addition to the agreements, working assumptions were made: One or multiple bandwidth part configurations for each component carrier can be semi-statically signaled to a UE. A bandwidth part consists of a group of contiguous physical resource blocks (PRBs). Reserved resources can be configured within the bandwidth part. The bandwidth of a bandwidth part equals to or is smaller than the maximal bandwidth capability supported by a UE. The bandwidth of a bandwidth part is at least as large as the synchronization signal (SS) block bandwidth. The bandwidth part may or may not contain the SS block.

Further working assumptions relate to the configuration of a bandwidth part, which may include the following properties: Numerology, Frequency location (e.g., center frequency), and Bandwidth (e.g., number of PRBs). Note that the above working assumptions are for the RRC connected mode of an UE. It remained for further study (FFS) how to indicate to the UE which bandwidth part configuration (if multiple) should be assumed for resource allocation at a given time. Also the neighbor cell radio resource management (RRM) measurements remained for further study.

Subsequently, in 3GPP RAN1 #89, the above working assumptions were confirmed as agreement.

In this respect, it may be concluded that the bandwidth part (BP) adaptation for power saving relies on a following configuration: at least two downlink BPs are semi-statically configured for a given UE, one is narrowband, and the other is wideband. Narrowband BP can be activated for the UE if traffic is low. As a result, reception over a narrower bandwidth can provide power saving gain for the UE. A wideband BP can be activated for the UE if the traffic is high, in order to boost the data rate.

Separate therefrom, in 3GPP RAN2 it was agreed to implement mechanisms similar to the discontinuous reception (DRX) framework of LTE in the downlink of NR. In the following, a brief introduction of a potential implementation to a DRX framework for NR will be given with respect to different examples of downlink communications.

Figures 1C, 1D:
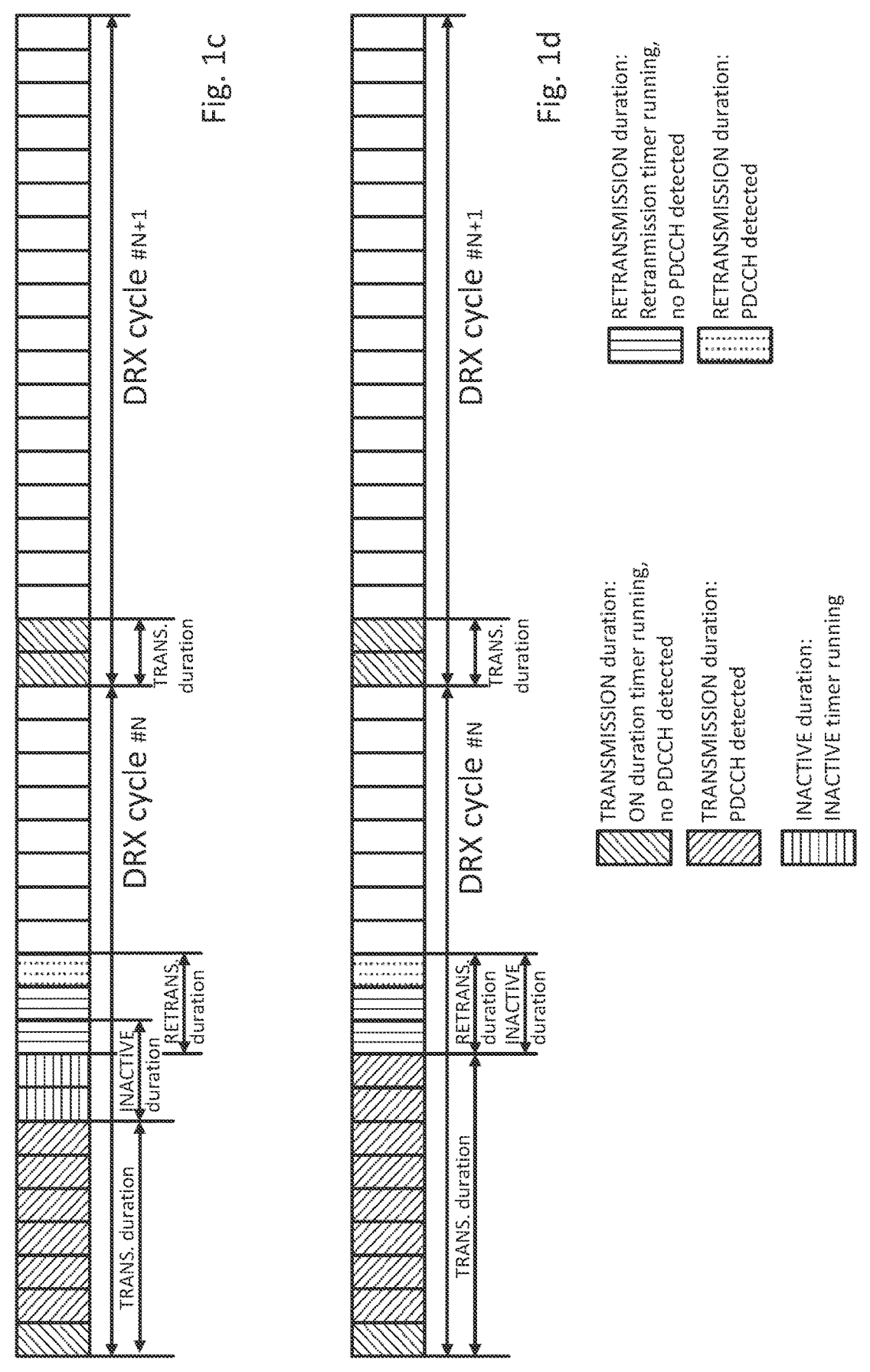

Different examples of downlink communications are depicted in FIGS. 1a-1d utilizing the DRX framework in NR. Particularly, all the FIGS. 1a-1d show a downlink communication in NR between a base station (also referred to as gNodeB or gNB) and a mobile terminal (also referred to as UE). So despite the necessity to also perform uplink communication between the mobile terminal and the base station, this has been omitted in the figures and description for conciseness reasons only.

In general, the discontinuous reception framework is introduced to alleviate the necessity for the UE to continuously monitor the downlink channels. A DRX cycle consists of an "ON duration" during which the UE should monitor the physical downlink control channel and a "DRX period" during which the UE can skip reception of downlink channels for battery saving purposes.

The parameterization of the DRX cycle involves a trade-off between battery saving and latency. On the one hand, a long DRX period is beneficial for lengthening the UE's battery life. For example, in case of short bursts of traffic demands, it is usually a waste of resources for the UE to continuously monitor downlink channels while there is no traffic to meet the supply. On the other hand, a short DRX period is better for faster response when data transfers resumed.

The use of a DRX cycle is controlled by the gNodeB. For example, a UE may be configured with a long DRX cycle and a short DRX cycle and the transition between the two DRX cycles may be either controlled by a timer or by explicit commands from the gNodeB. The gNodeB may configure the UE to transition to continuous reception, thereby setting the "ON duration" to the maximum and "DRX period" to zero.

The configuration of a DRX cycle involves at least three timers, namely the "on duration" timer, the "inactivity" timer and the "retransmission" timer. With these three timers, in the DRX cycle the individual monitoring durations for the UE are specified, namely the transmission period for the gNodeB to transmit data and/or control signals to the UE, the inactive period which is trailing a transmission to the UE, and retransmission period(s) which would enable retransmissions in case of communication failures.

Thus, the at least three timers determine for a DRX cycle the time when the UE has to monitor the downlink from the gNodeB, while for the remaining time it can assume a power saving state. At the end of a DRX cycle, the gNodeB controls the UE to repeat the DRX cycle or it controls the UE to transits to a different long/short DRX cycle, or even to continuous reception. The control is facilitated by a timer or by explicit commands as discussed before.

Referring now to FIGS. 1a-1d in more detail:

Each of the Figures shows two DRX cycles #N and #N+1, both with a total of 20 consecutive slots that may also be referred to as scheduling intervals. For example, the slots of both the DRX cycles #N and #N+1 may be referred to with an individual numbers, such that the first slot of a DRX cycle is slot #0 and the last slot of the DRX cycle is slot #19. However, the slots can also be referred to with continuously increasing numbers.

Additionally, it must be clarified that even though the following description assumes that the scheduling interval for a downlink data transmission is one slot, this shall not be construed as limiting the present disclosure. Rather, it may also be understood that one scheduling interval corresponds to one transmission time interval (TTI) in MAC layer which is defined using number of symbols. Taking into consideration the diverse requirements of different services in NR in terms of data rates, latency and coverage, different TTIs are envisioned. Different TTI durations therefore have different numbers of symbols, e.g., corresponding to a mini-slot, one slot, or multiple slots in one transmission direction.

In FIG. 1a, an example of two consecutive DRX cycles #N and #N+1 is shown with no downlink data transmissions from the gNodeB to the UE. Irrespective thereof, for both DRX cycles the UE is configured with a "ON duration" timer with a timer value of 2 slots. Thus, the UE wakes up during time slots #0 and #1 of both DRX cycles #N and #N+1 to monitor the physical downlink control channel for potential downlink assignment.

Assuming a similar operation of NR compared to LTE, the UE monitors (at least) as long as the "ON duration" timer is running the physical downlink control channel (PDCCH) for scheduling assignments (downlink resource allocations), namely for downlink control information (DCI) messages with a resource block (RB) assignment and a new data indicator (NDI) where the CRC is scrambled with the UE identity (i.e., a radio network temporary identifier (RNTI) of the UE, particularly the cell radio network temporary identifier (C-RNTI) of the UE). Thereby, the UE can identify whether a downlink control information (DCI) message is for the UE or not.

Having monitored the physical downlink control channel and having detected no downlink assignments for the UE, it goes in slot #2 back to sleep and continues to sleep for the remaining part of the DRX cycle #N. In other words, the UE is in a DRX period from slot #2 to slot #19 of DRX cycle #N. Thereby, the power consumption for the downlink communication can be reduced in the UE during DRX cycle #N. The same behavior of the UE repeats for DRX cycle #N+1

It shall be pointed out that for this example that the "inactive" duration and the "retransmission" duration are not set off due to the absence of any downlink assignments and downlink transmissions. Since there is no detected downlink assignment and there is no received downlink transmission, the UE would not set off or reset the INACTIVE timer. Additionally, in the absence of any downlink data transmissions, there could not be any communication failures that would require setting off or starting the RETRANSMISSION timer.

In FIG. 1b, an example of two consecutive DRX cycles #N and #N+1 is shown with downlink data transmissions from the gNodeB to the UE in DRX cycle #N and with no downlink data transmissions in DRX cycle #N+1. Irrespective thereof, for both DRX cycles the UE is configured with an "ON duration" timer with the value of 2. Thus, the UE wakes up (at least) during time slots #0 and #1 of both DRX cycles #N and #N+1 to monitor the physical downlink control channel for potential downlink assignments.

Due to the "ON duration" timer, the UE wakes up in slot #0 and monitors the physical downlink control channel. In this slot #0 the UE does not detect a downlink assignment for the UE, which however changes for slots #1-#3.

Having detected, in slot #1, a scheduling assignment in the physical downlink control channel (e.g., downlink control information (DCI) message which includes a RB assignment for an initial transmission) for the UE, it refers to the resource block(s) (RBs) indicated by the scheduling assignment in the physical downlink shared channel (PDSCH) and refers to the downlink data transmission in the indicated resource block(s). Thereby, in this slot #1, the UE receives the scheduled downlink data transmission. Having received a downlink data transmission, the UE resets the INACTIVE timer.

Similarly, in slots #2 and #3, the UE detects a downlink assignment in the physical downlink control channel which schedules a downlink data transmission in the same slots #2 and #3, respectively. Thus, also in slots #2 and #3, the UE receives the scheduled downlink data transmission, and the UE resets, in each of these slots #2 and #3 the INACTIVE timer. Accordingly, in slot #3, the INACTIVE timer is still at its reset value, i.e., at the value of 3 slots.

As can be inferred from this example, the short "ON duration" period of 2 slots does not limit the downlink data transmission to these two slots only. Rather, having been scheduled with a data transmission during a slot within the "ON duration" period, the UE does reset the INACTIVE timer. During this time INACTIVE period, the UE remains monitoring the physical downlink control channel for further downlink assignments.

In this example, the TRANSMISSION duration extends from slot #0 to slot #3, hence encompasses the period where the "ON duration" timer is running but is not restricted in this respect. Rather, the TRANSMISSION duration shall be understood, in the context of the present disclosure, as time period which includes contiguous downlink data transmissions which have started while the "ON duration" timer is running but are not limited in this respect.

Despite monitoring in slot #4 the physical downlink control channel, the UE does not receive a scheduling assignment. Thus, this slot #4 is considered part of the INACTIVE duration. And the INACTIVE timer will be decreased by the value of 1 slot. Since in this example, the INACTIVE timer was reset to 3 slots (=initial value) before slot #4, the INACTIVE duration includes the slots #4-#6.

In slot #7 the INACTIVE timer has expired such that UE goes to sleep. Also in slot #8 the UE is sleeping and does not monitor the physical downlink control channel.

As shown for slots #9-#11, the UE needs to wake-up for potential retransmissions during a RETRANSMISSION duration which is provided for should one of the (initial) downlink data transmissions have failed. The RETRANSMISSION duration is separately configured for each (initial) downlink data transmission, e.g., per hybrid Automatic Repeat Request (HARQ) process.

In this example, only a single RETRANSMISSION duration is shown, namely the one for the (initial) transmission in slot #1. Thus, the shown RETRANSMISSION duration is aligned with the initial transmission in slot #1, e.g., starts at a predetermined offset, in this example 8 slots. In other words, the RETRANSMISSION duration starts at slot #9 for the initial downlink data transmission in slot #1 and continues as long as the RETRANSMISSION timer is running. It terminates earlier if the UE has received the according downlink data retransmission.

Assuming a similar operation of NR compared to LTE, if the initial transmission was not successfully decoded by the UE, the UE monitors during the RETRANSMISSION period the physical downlink control channel (PDCCH) for scheduling assignments, namely for downlink control information (DCI) messages with a resource block (RB) assignment and no new data indicator (NDI) but am indication of the corresponding HARQ process, where again the CRC is scrambled with the UE identity (i.e., a radio network temporary identifier (RNTI) of the UE, particularly the cell radio network temporary identifier (C-RNTI) of the UE).

Having detected, as in slot #11, a scheduling assignment (e.g., a downlink control information (DCI) message which includes a RB assignment for the retransmission) for the UE, it refers to the resource block(s) (RBs) indicated by the scheduling assignment in the physical downlink shared channel (PDSCH) and receives the downlink data retransmission in the indicated resource block(s) in slot #11. Notably, the downlink data retransmission does not set off any INACTIVE duration.

Since the downlink data retransmission has been received in slot #11, the UE goes in slot #12 back to sleep and continues to sleep for the remaining part of DRX cycle #N. In other words, the UE is in a DRX period from slot #12 to slot #19 of the DRX cycle #N. Same behavior of the UE going to sleep would have occurred in case the UE would not have not received a downlink data retransmission, but instead the RETRANSMISSION timer has elapsed. Also hereby, the power consumption for the downlink communication can be reduced in the UE during DRX cycle #N.

Regarding the behavior of the UE in DRX cycle #N+1 reference is only made to the description in FIG. 1a for reasons of brevity.

In FIG. 1c, an example of two consecutive DRX cycles #N and #N+1 is shown with downlink data transmissions from the gNodeB to the UE in DRX cycle #N and with no downlink data transmissions in DRX cycle #N+1. The shown example of FIG. 1c is very similar to the example in FIG. 1b, however, with the difference, that downlink data transmissions are received not only in slots #1-#3 but in slots #1-#6.

Due to these (extended) downlink data transmissions from the gNodeB to the UE in DRX cycle #N, the INACTIVE duration after the (initial) downlink data transmissions overlaps with a RETRANSMISSION duration separately configured for each (initial) downlink data transmission, e.g., per hybrid Automatic Repeat Request (HARD) process. In this example, only a single RETRANSMISSION duration is shown, namely the one for the (initial) transmission in slot #1.

As will become apparent from the FIG. 1c, the UEs operation during the RETRANSMISSION duration can coexist with over the behavior during the INACTIVE duration.

Again, due to the "ON duration" timer, the UE wakes up in slot #0 and monitors the physical downlink control channel. In this slot #0 the UE does not detect a downlink assignment for the UE, which however changes for slots #1-#6. In each of the slots #1-#6, the UE detects downlink assignments in the physical downlink control channel which schedule a downlink data transmission in the same slots #1-#6, respectively.

Thus, in slots #1-#6, the UE receives the scheduled downlink data transmission, and the UE resets, in each of these slots #1-#6 the INACTIVE timer. Accordingly, in slot #6, the INACTIVE timer is still at its reset value, i.e., at the value of 3 slots.

Despite monitoring in slot #7 the physical downlink control channel, the UE does not receive a scheduling assignment. Thus, this slot #7 is considered part of the INACTIVE duration. And the INACTIVE timer will be decreased by the value of 1 slot. Since in this example, the INACTIVE timer was reset to 3 slots (=initial value), the INACTIVE duration includes the slots #7-#9.

As shown for slots #9-#11, the UE needs to wake-up for potential retransmissions during a RETRANSMISSION duration which is provided for should one of the (initial) downlink data transmissions have failed. The RETRANSMISSION duration is separately configured for each (initial) downlink data transmission, e.g., per hybrid Automatic Repeat Request (HARM) process.

Again, in this example only a single RETRANSMISSION duration is shown, namely the one for the (initial) transmission in slot #1, and starts at a predetermined offset, corresponding to slot #9. From this slot onward, the RETRANSMISSION duration is shown for slots #9-#11.

Notably, in slot #9, the INACTIVE timer has not expired such that, for this reason alone, the UE monitors the physical downlink control channel. However, since slots #9 also belongs to the RETRANSMISSION period, the UE also monitors the physical downlink control channel for potential downlink data retransmissions. These two behaviors of the UE do not conflict but can be performed in coexistence.

In the example, in slot #11 the UE detects a scheduling assignment and, in the same slot #11 receives the corresponding downlink data retransmission. Since the downlink data retransmission has been received in slot #11, the UE goes in slot #12 back to sleep and continues to sleep for the remaining part of DRX cycle #N. Also hereby, the power consumption for the downlink communication can be reduced in the UE during DRX cycle #N.

Regarding the behavior of the UE in DRX cycle #N+1 reference is only made to the description in FIG. 1a for reasons of brevity.

In FIG. 1d, an example of two consecutive DRX cycles #N and #N+1 is shown with downlink data transmissions from the gNodeB to the UE in DRX cycle #N and with no downlink data transmissions in DRX cycle #N+1. The shown example of FIG. 1d is very similar to the examples in FIGS. 1b and 1c, however, with the difference, that downlink data transmissions are received in slots #1-#8.

Due to these (extended) downlink data transmissions from the gNodeB to the UE in DRX cycle #N, the INACTIVE duration after the (initial) downlink data transmissions coincides with a RETRANSMISSION duration separately configured for each (initial) downlink data transmission, e.g., per hybrid Automatic Repeat Request (HARD) process. In this example, only a single RETRANSMISSION duration is shown, namely the one for the (initial) transmission in slot #1.

Referring now to FIG. 2 in more detail:

FIG. 2 illustrates a block diagram of a communication system including a mobile terminal 210 and a base station 260 communication with each other over a (wireless) physical channel 250. In the context of the present disclosure, however, reference will only be made to the downlink communication between mobile terminal 210 and base station 260.

The mobile terminal 210 is for communicating in a mobile communication system with a base station 260 using at least one of a first bandwidth part, BP1, and a second bandwidth part, BP2. Both, the first and second bandwidth part BP1 and BP2 are within a system bandwidth, wherein the first bandwidth part, BP1, is smaller than the second bandwidth part, BP2. The mobile terminal 210 comprises a transceiver 220 which, in operation, receives a configuration of a discontinuous reception, DRX, cycle. Further, the mobile terminal 210 comprises a processor 230 which, in operation, configures, upon reception of the configuration of the DRX cycle, the a downlink communication during at least one of the communication periods within the DRX cycle to use a specific one of at least the first bandwidth part, (BP1), and the second bandwidth part, BP2.

The base station 260 is for communicating in a mobile communication system with a mobile terminal 210, using at least one of a first bandwidth part, BP1, and a second bandwidth part, BP2. Both, the first and second bandwidth part BP1 and BP2 are within a system bandwidth, wherein the first bandwidth part, BP1, is smaller than the second bandwidth part, BP2. The base station 260 comprises a transceiver 270 which, in operation, transmits a configuration of a discontinuous reception, DRX, cycle. Further, the base station 260 comprises a processor 280 which, in operation, configures, upon transmission of the configuration of the DRX cycle, a downlink communication during at least one of the communication periods within the DRX cycle to use a specific one of at least the first bandwidth part, BP1, and the second bandwidth part, BP2.

Also disclosed is a operating method to be performed by a mobile terminal using at least one of a first bandwidth part, BP1, and a second bandwidth part, BP2, within a system bandwidth, the first bandwidth part, BP1, being smaller than the second bandwidth part, BP2. The operating method comprises the steps of receiving a configuration of a discontinuous reception, DRX, cycle; and configuring, upon reception of the configuration of the DRX cycle, a downlink communication during at least one of the communication periods within the DRX cycle to use a specific one of at least the first bandwidth part BP1 and the second bandwidth part BP2.

Further disclosed is a operating method to be performed by a base station using at least one of a first bandwidth part, BP1, and a second bandwidth part, BP2, within a system bandwidth, the first bandwidth part, BP1, being smaller than the second bandwidth part, BP2. The operating method comprises the steps of transmitting a configuration of a discontinuous reception, DRX, cycle; and configuring, upon transmission of the configuration of the DRX cycle, a downlink communication during at least one of the communication periods within the DRX cycle to use a specific one of at least the first bandwidth part BP1, and the second bandwidth part BP2.

In the following, the operation of a mobile terminal (also referred to as UE) and of a base station (also referred to as gNodeB or gNB) according to an exemplary embodiment is described with respect to FIGS. 3a-3d and 4a-4d. In all the different examples, a downlink communication between the gNodeB and the UE is to occur during at least one of the communication periods specified in a discontinuous reception, DRX, cycle.

A DRX cycle includes different communication periods, for example the TRANSMISSION period, the INACTIVE period, and the RETRANSMISSION period.

During all these periods of the DRX cycle, the UE is required to at least monitor the physical downlink control channel for potential downlink communication. At the same time, the DRX cycle also includes no-communication periods, which may also referred to as DRX period(s). During these no-communication periods the UE can skip reception of downlink channels for battery saving purposes.

Notably, not only the UE but also the gNodeB has to operate according to a same DRX cycle for successful downlink communications between the two. It would not be sufficient for (only) the UE to operate according to the DRX cycle. Then, the gNodeB would not know if a downlink communication was actually received by the UE. Thus, for successful downlink communications both the UE and the gNodeB need to be configured with the same DRX cycle. However, the gNodeB can be configured with multiple different DRX cycles, each corresponding to an individual UE.

As described before, in NR the concept of bandwidth part adaptation is introduced, exemplarily, for downlink communication between the gNodeB and the UE. Due to the bandwidth part adaptation, it becomes possible to further alleviate the reception requirements for downlink communications between the gNodeB and the UE. Namely by assuming the usage of narrow bandwidth part UE can skip monitoring the system bandwidth outside of the adapted narrow bandwidth part. Thus, this concept can also be employed for battery saving purposes.

Notably, also here not only the UE but also the gNodeB has to operate according to a same adapted bandwidth part for successful downlink communications between the two. It would not be sufficient for (only) the UE to operate in an accordingly adapted bandwidth part. Then, the gNodeB would also not know if a downlink communication was actually received by the UE. Thus, for successful downlink communications, also here, the UE and the gNodeB need to have a common understanding with the same adapted bandwidth part. Nevertheless, gNodeB can operate on multiple bandwidth parts simultaneously, each for an individual UE.

In view of this understanding, the present disclosure combines both mechanisms to attain a maximum amount of battery saving while at the same time keeping the complexity of synchronizing both mechanisms at a minimum. It shall be emphasized that the combination of the two mechanisms reduces the reception requirements for the UE in time domain as well as frequency domain, thereby achieving a synergistic effect between the two.

The present disclosure does not stop at recognizing that both mechanisms can coexist in a mobile communication system. Rather, as part of the present disclosure it is recognized that there are specific combinations of bandwidth part usages advantageously combine with the individual communication periods of a DRC cycle. In this respect, a semi-static configuration of adapted bandwidth parts is suggested for at least one of the communication periods in a DRX cycle.

In this respect, it is the underlying concept of the present disclosure that the UE as well as the gNodeB already knows (e.g., by way of semi-static configuration) which specific one of two distinct bandwidth parts can be advantageously used during the at least one communication period of the DRX cycle once the UE is configured by the gNodeB. This knowledge in the UE shall however, not prevent the gNodeB from additionally controlling the usage of bandwidth parts dynamically. Nevertheless, it is a prerequisite to the present disclosure that the UE and the gNodeB can use for downlink communication in a mobile communication system at least one first, narrow bandwidth part BP1 or a second, wide bandwidth part BP2. On this basis, it can then be assumed that the UE and the gNodeB refer to particular usage combinations in the following table for the bandwidth part usage during the at least one communication period within a DRX cycle.

The bandwidth part usage combinations are summarized in the following table.

|  | first usage | second usage | third usage | fourth usage |
| --- | --- | --- | --- | --- |
| TRANSMISSION duration of DRX cycle | wide bandwidth part BP2 | narrow bandwidth part BP1 | narrow bandwidth part BP1 | narrow bandwidth part BP1 |
| INACTIVE duration of DRX cycle | wide bandwidth part BP2 | wide bandwidth part BP2 | narrow bandwidth part BP1 | narrow bandwidth part BP1 |
| RETRANSMISSION duration of DRX cycle | wide bandwidth part BP2 | wide bandwidth part BP2 | wide bandwidth part BP2 | narrow bandwidth part BP1 |

Again it shall be emphasized that neither one of the above indicated bandwidth part usage combinations restricts the downlink communication to the respective one of the first or second bandwidth part for the respective one of the communication periods of the DRX cycle. Rather, the gNodeB may still, in addition, control the use of the bandwidth parts dynamically.

Referring to FIG. 3a, an example of two consecutive DRX cycles #N and #N+1 with no downlink data transmissions from the gNodeB to the UE. Irrespective thereof, for both DRX cycles the UE is configured with a "ON duration" timer with a timer value of 2 slots. Thus, the UE wakes up during time slots #0 and #1 of both DRX cycles #N and #N+1 to monitor the physical downlink control channel for potential downlink assignment.

In this example, the UE and the gNodeB are configured according to the fourth bandwidth part usage combination (short: fourth usage). Thus, the UE monitors the physical downlink control channel in slots #0 and #1 of both DRX cycles #N and #N+1 using the first, narrow bandwidth part BP1. This fourth bandwidth part usage combination attains a maximum battery saving effect for downlink communication between the gNodeB and the UE.

The fourth bandwidth part usage combination may be indicated by the gNodeB to the UE in advance, for example by way of a bandwidth usage indication, or may be indicated by the gNodeB to the UE at the same time of configuring the DRX cycle. In both cases, the UE already knows, when configuring the DRC cycle, which of the first or the second bandwidth parts it shall use during the individual communication periods of the DRX cycle.

In one exemplary implementation, the bandwidth usage indication may be included in a (dedicated) radio resource configuration, RRC, message. In an alternative exemplary implementation, the bandwidth indication may be included in the RRC message configuring the DRX cycle. Further alternatives include a downlink control information, DCI, message or a Medium Access Control, MAC, Control Element.

The UE then monitors using the narrow bandwidth part, BP1, as specified for the second usage, (at least) as long as the "ON duration" timer is running the physical downlink control channel (PDCCH) for scheduling assignments (downlink resource allocations), namely for downlink control information (DCI) messages with a resource block (RB) assignment and a new data indicator (NDI) where the CRC is scrambled with the UE identity (i.e., a radio network temporary identifier (RNTI) of the UE, particularly the cell radio network temporary identifier (C-RNTI) of the UE). Thereby, the UE can identify whether a downlink control information (DCI) message is for the UE or not.

Having restricted the monitoring of the physical downlink control channel to the first, narrow bandwidth part, BP1, the UE benefits from a reduced power consumption. At the same time the gNodeB has also to use for downlink communications the same first, narrow bandwidth part, BP1. As already discussed with reference to FIG. 1a, the UE goes in slot #2 back to sleep and continues to sleep for the remaining part of the DRX cycle #N. The same behavior of the UE repeats for DRX cycle #N+1.

Referring to FIG. 3b, an example of two consecutive DRX cycles #N and #N+1 is shown with downlink data transmissions from the gNodeB to the UE in DRX cycle #N and with no downlink data transmissions in DRX cycle #N+1.

In this example, the UE and the gNodeB are (again) configured according to the fourth bandwidth part usage combination (short: fourth usage). Thus, the UE monitors the physical downlink control channel in slots #0 and #1 of both DRX cycles #N and #N+1 using the first, narrow bandwidth part BP1. This fourth bandwidth part usage combination attains a maximum battery savings effect for downlink communication between the gNodeB and the UE.

Again, the fourth bandwidth part usage combination may be indicated by the gNodeB to the UE in advance, for example by way of a bandwidth usage indication, or may be indicated by the gNodeB to the UE at the same time of configuring the DRX cycle. In both cases, the UE already knows, when configuring the DRC cycle, which of the first or the second bandwidth parts BP1 or BP2 it shall use during the individual communication periods of the DRX cycle.

Additionally, in this example, the UE is controlled by the gNodeB so that it dynamically activates the second, wide bandwidth part for downlink data transmissions from the gNodeB. When the UE detects a scheduling assignment for a downlink data transmission to itself, then the UE activates for the downlink data transmission in the indicated RBs the second, wide bandwidth part, BP2. This second, wide bandwidth part, BP2 then remains activated for the remaining slots of the TRANSMISSION duration.

Thus, with this dynamic activation the gNodeB utilizes for the (initial) downlink data transmissions the second, wide bandwidth part, BP2, to the UE, thereby maximizing throughput, whereas the UE can remain for monitoring purposes in the first, narrow bandwidth part, BP1, for battery saving purposes. Hence, an advantageous combination of the two concepts is achieved.

It shall be emphasized, for this example, that the dynamic activation of the second, wide bandwidth part, BP2, and the deactivation of the first, narrow bandwidth part, BP1, does not require any separate signaling, for example, included in the scheduling assignment received by the UE from the gNodeB. Rather, due to the fact that the UE activates the second, wide bandwidth part, BP2 in response to the detection of the (standard) scheduling assignment, it can use, without delay, the second, wide bandwidth part, BP2, for the indicated downlink data transmission.

The dynamic activation of the second, wide bandwidth part BP2 is advantageously limited to (remaining part of) the TRANSMISSION duration of only that DRX cycle. In a subsequent DRX cycle, the UE will start monitoring the physical downlink control channel with the first, narrow bandwidth part BP1. Also, the dynamic activation of the second, wide bandwidth part BP2 does not have any effect on the other communication periods of the same DRX cycle, namely the INACTIVE and the RETRANSMISSION duration.

Thus, with this dynamic activation, the throughput for downlink communications between the gNodeB and the UE can be maximized, yet, retaining this effect for a short time frame only (i.e., the transmission period), and, at the same time, avoiding any complex signaling for the bandwidth part activation. In the remainder of the DRX cycle, a maximum battery savings effect due to the downlink communication between the gNodeB and the UE being configured according to the fourth bandwidth part usage combination.

Referring to this example in more detail, due to the "ON duration" timer, the UE wakes up in slot #0 and monitors the physical downlink control channel. In this slot #0 the UE does not detect a downlink assignment for the UE. Thus, for monitoring the physical downlink control channel in slot #0 the UE uses the first, narrow bandwidth part, BP1.

When detecting, in slot #1, a scheduling assignment in the physical downlink control channel (e.g., downlink control information (DCI) message which includes a RB assignment for an initial transmission) for itself, the UE also dynamically activates the second, wide bandwidth part BP2.

The activation time for activating the second, wide bandwidth part BP2 (and the deactivation of the first, narrow bandwidth part BP1) is sufficient for the UE to refer to the resource block(s) (RBs) indicated by the scheduling assignment in the physical downlink shared channel (PDSCH) and to receive the downlink data transmission in the indicated resource block(s).

Thus, the UE receives, in this slot #1, the scheduled downlink data transmission using the second, wide bandwidth part BP2. Having received a downlink data transmission, the UE proceed in slots #2 and #3 to also receive downlink data transmissions using the second, wide bandwidth part BP2. Thus, for the remainder of the TRANSMISSION duration, the UE remains in the second, wide bandwidth part BP2, thereby attaining maximum throughput in the downlink communication of the DRX cycle #N.

Despite monitoring in slot #4 the physical downlink control channel, the UE does not receive a scheduling assignment. Thus, this slot #4 is considered part of the INACTIVE duration. Thus, for this slot #4 the UE activates the first, narrow bandwidth part, BP1, (and deactivates the second, wide bandwidth part BP2), as specified by the fourth bandwidth part usage combination. Thereby, the monitoring of the physical downlink control channel during the INACTIVE duration can be performed by the UE with a maximum battery saving effect. The UE remains in the first, narrow bandwidth part, BP1, for the (entire) INACTIVE duration, namely not only for slot #4 but also for slots #5 and #6. The motivation of having such configuration is that it is most likely that UE enters INACTIVE time because the traffic burst is finished or close to the end with only a few HARQ processes left. Due to low traffic demand in INACTIVE duration, UE can enjoy power saving by using narrow bandwidth part, BP1, without sacrificing the possibility for gNodeB to communicate with UE.

As shown for slots #9-#11, the UE needs to wake-up for potential retransmissions during a RETRANSMISSION duration which is provided for should one of the (initial) downlink data transmissions have failed. The RETRANSMISSION duration is separately configured for each (initial) downlink data transmission, e.g., per hybrid Automatic Repeat Request (HARQ) process.

For the RETRANSMISSION duration, the UE again activates the first, narrow bandwidth part, BP1 (and deactivates the second, wide bandwidth part BP2) as specified by the fourth bandwidth part usage combination. Thus also the monitoring and receiving of downlink data retransmissions during the RETRANSMISSION can be performed by the UE with a maximum battery savings effect. As shown in FIG. 3b, the RETRANSMISSION duration occurs after the INACTIVE duration, meaning that the traffic burst is close to the end. Therefore, using narrow bandwidth part, BP1, would be sufficient for gNodeB to deliver the possible data.

In conclusion, the fourth bandwidth part usage combination attains a maximum battery saving effect for downlink communication between the gNodeB and the UE. Beneficially, in combination with the dynamic activation during the TRANSMISSION duration, the throughput for at least the (initial) downlink data transmissions can also be improved in the same DRX cycle. This advantageous combination does not even require any complex signaling, as discussed before.

With reference to FIGS. 3c and 3d further examples of two consecutive DRX cycles #N and #N+1 are shown with downlink data transmissions from the gNodeB to the UE in DRX cycle #N and with no downlink data transmissions in DRX cycle #N+1.

Also here, the UE and the gNodeB are configured according to the fourth bandwidth part usage combination (short: fourth usage), with additionally, a dynamic activation of the second, wide bandwidth part BP2 for downlink data transmissions during the TRANSMISSION duration. Thus, this results in a similar usage of the first and second bandwidth parts BP1 and BP2 as compared with the downlink communication in FIG. 3b. Thus, a detailed description thereof is omitted herein for reasons of brevity.

Yet, it shall be emphasized that irrespective of whether the individual communication periods of the DRX cycle are separate from each other in time (as in FIG. 3b), are overlapping each other in time (as in FIG. 3c), or coincide with each other in time (as in FIG. 3d), the definition of the bandwidth part usage combinations always allows an unique identification of which specific one of the first or second bandwidth parts BP1 and BP2 are to be activated, namely during the TRANSMISSION, INACTIVE and RETRANSMISSION duration of the DRX cycle.

Referring now to FIGS. 4a-4d, further examples of two consecutive DRX cycles #N and #N+1 are shown with the gNodeB communicating (or not) in the downlink with the UE in the respective communication periods of the DRX cycle. In all these examples, the UE and the gNodeB are configured according to the third bandwidth part usage combination (short: third usage), with additionally, a dynamic activation of the second, wide bandwidth part BP2 for downlink data transmissions during the TRANSMISSION duration of the DRX cycle.

Figure 4C:
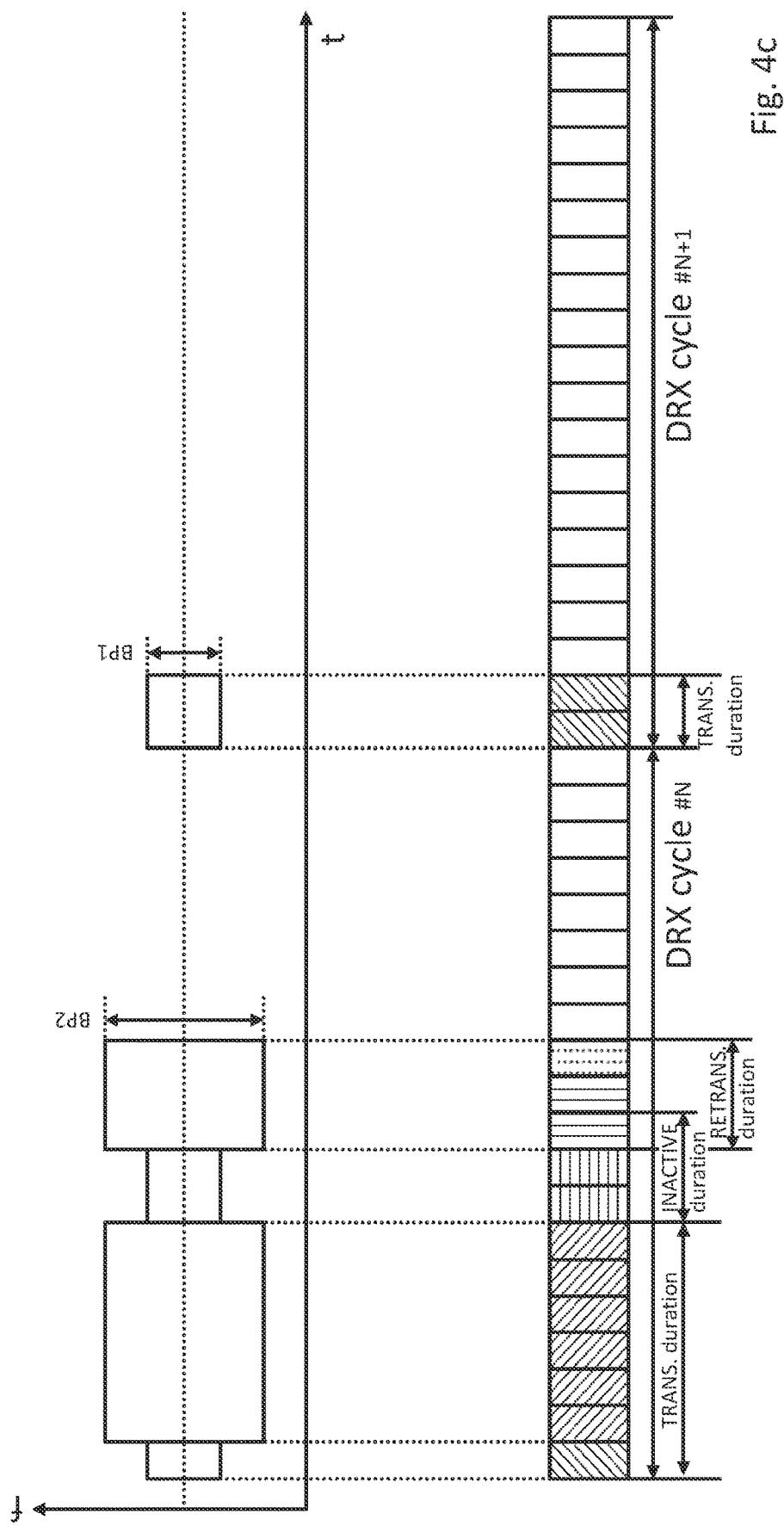

Thus, the UE activates the first, narrow bandwidth part, BP1, at the start of the TRANSMISSION duration of the DRX cycles of all FIGS. 4a-4d. Then, as shown in FIGS. 4b-4d, the detection of a scheduling assignment in the physical downlink control channel results in the activation of the second, wide bandwidth part, BP2, and the usage thereof for downlink data transmissions. This second wide bandwidth part, BP2 remains activated for the remainder of the TRANSMISSION duration of the same DRX cycle.

After completion of the downlink data transmissions (also no further scheduling assignment are detected), the UE assumes the INACTIVE duration and, for this purpose, in slot #4 in FIG. 4b, in slot #7 in FIG. 4c, or in slot #9 in FIG. 4d the first, narrow bandwidth part, BP1 is activated. This again complies with what is specified by the third bandwidth part usage combination.

For the RETRANSMISSION period, starting at slot #9 in FIGS. 4b-4d, the UE activates again the second, wide bandwidth part, BP2, for monitoring the physical downlink control channel and for potentially receiving downlink data retransmissions over the physical downlink shared channel. Due to the usage of the second, wide bandwidth part, BP2, a higher reliability for the downlink data retransmissions can be achieved, since the gNodeB has more freedom in the frequency domain to schedule the resources for retransmission which can bring lower code rate or/and better diversity Also with the usage of the second, wide bandwidth part, BP2, the UE favorably uses also the same bandwidth part for the downlink data retransmissions as for the (initial) downlink data transmission. However, the power consumption could slightly increase, compared to the fourth usage as described before.

Different Dynamic Activation Mechanisms

In addition to the dynamic activation for downlink data transmissions already discussed above with reference to the figures, there are different dynamic activation mechanisms that can be used to complement the different semi-statically configured first to fourth bandwidth part usage combinations. All of the following mechanisms can be readily applied to downlink communication in the DRX cycles and result in further advantages depending on the envisioned scenario.

In one mechanism, the UE dynamically activates the second, wide bandwidth part, BP2, when it detects, during the RETRANSMISSION duration, a scheduling assignment indicating a downlink data retransmission for a corresponding (initial) transmission (e.g., via the HARQ information in the downlink control information, DCI, message). Then, the UE receives from the gNodeB the downlink data retransmission using the activated second, wide bandwidth part, BP2.

With this dynamic activation mechanism of the second, wide bandwidth part, BP2, during the RETRANSMISSION duration, the gNodeB may be more flexible in selecting resource block(s) to the scheduling assignment for the downlink data retransmission. This flexibility may result in further improvements to the reliability during the RETRANSMISSION duration, particularly if the gNodeB has to cope with higher number of transmission failures.

It is immediately apparent that this dynamic activation of the second, wide bandwidth part BP2 during the RETRANSMISSION duration can be combined with the dynamic activation of the same second, wide bandwidth part BP2 during the TRANSMISSION duration. Nevertheless, it must be kept in mind, that the every dynamic activation also consumes some battery, hence reduces the overall battery savings effect.

In another mechanism, the UE dynamically activates the same bandwidth part (e.g., BP1 or BP2) to be used for the downlink data retransmissions as in the (initial) downlink data transmission. This mechanism assumes that an (initial) downlink data transmission between the gNodeB and the UE has failed during the TRANSMISSION duration, and that the UE detects, during the RETRANSMISSION duration, a scheduling assignment for the according retransmission. Then, in this mechanism, the UE activates the same one of the bandwidth parts (BP1 or BP2) which was also used for the (initial) downlink data transmission.

Such a dynamic activation pattern may be advantageous if gNodeB wants to ensure that it has the same bandwidth part at its disposal for the (initial) transmission as well as for the retransmission. If, one the one hand, the gNodeB does attribute a low priority to the (initial) transmissions to the UE, it may hereby also ensure that the retransmissions are also handled with a same low priority. If, on the other hand, the gNodeB does attribute a high priority to the (initial) transmission to the UE, then same holds true also for the retransmissions.

It is immediately apparent that the dynamic activation with the same bandwidth part for the retransmission as for the initial transmission, the gNodeB can enforce a same level of priority upon both transmissions even when variably combining this mechanism with changing bandwidth part usage combinations. Also the same level of priority can be enforced if the dynamic activation of the second, wide bandwidth part, BP2, is frequently changed.

In both dynamic mechanisms mentioned above, the DCI message carrying scheduling assignment itself can be used as the trigger for dynamic bandwidth part switching. Therefore, no additional bit field in DCI is needed to explicitly indicate the bandwidth part switching.

In yet another mechanism, the gNodeB transmits to the UE in form of a downlink control information (DCI) message including an instruction to activate a specific bandwidth part (BP1 or BP2) for the (entire duration) of a communication period of the DRX cycle. This may be realized by transmitting the DCI message in advance of the respective communication period being one of the TRANSMISSION period, the INACTIVE period, and the RETRANSMISSION period.

In such case, a dedicated bit field in DCI to indicate the activated bandwidth part is needed. The additional advantage of have the dedicated bit field in DCI is to facilitate the bandwidth part indication if multiple wide and narrow bandwidth parts are configured for the UE. In such case, the activated one (either wide or narrow) can be indicated by, e.g., bandwidth part index.

In response to the reception of the DCI message, the UE then configures the downlink communication with the gNodeB during the indicated communication period of the DRX cycle to use the instructed bandwidth part (BP1 or BP2).

Thereby the mechanism can even result in the dynamic activation of an instructed bandwidth part (BP1 or BP2) for the entire duration of a communication period of the DRX cycle. This is not possible with the other dynamic activation mechanisms which are all activating the respective bandwidth part only on demand, i.e., upon reception of a scheduling assignment. Thus, also this mechanism could complement the first to fourth bandwidth part usage combinations in an advantageous manner, for example in case of instantaneous traffic demands.

Since different dynamic mechanisms imply different DCI structures, UE and gNodeB should have a common understanding of which one of the above three mechanisms is currently used. This common understanding can be established, e.g., by RRC signaling from gNodeB to UE.

Advantages of the Semi-Statically Configured First to Fourth Usage

The first to fourth bandwidth part usage combinations (short: first to fourth usages) have different advantages, and are intended for different scenarios. Yet, they all have in common that either one of the first to fourth bandwidth part usage combinations specifies which of the first or second bandwidth part, BP1 or BP2, is to be used in all the different communication periods during the DRX cycle. In other words, either one of the first to fourth bandwidth usage combinations can be used for all different communication timings of the DRX cycle.

The first to fourth bandwidth usage combinations can readily result in a common understanding between the UE and the gNodeB which of the first or second bandwidth part, BP1 or BP2 is to be used during the entire DRX cycle. Thus, the first to fourth bandwidth usage combinations attain the advantageous effect that the UE can receive downlink communications during at least one, more particularly during all communication periods of the DRX cycle to use a specific one of the first and second bandwidth parts BP1 or BP2.

For this purpose, the first to fourth bandwidth usage combination is indicated semi-statically from the gNodeB to the UE, for instance, in a (dedicated) radio resource configuration, RRC, message. In an alternative exemplary implementation, the bandwidth indication may be included in the RRC message configuring the DRX cycle. Further alternatives include a downlink control information, DCI, message or a Medium Access Control, MAC, Control Element.

Alternatively, the first to fourth bandwidth usage combinations may also be specified in a suitable section in 3GPP technical standard of NR, such that the indication from the gNodeB to the UE only includes a reference to the one of the first to fourth bandwidth usage combinations. This could be achieved by, as few as two bits, provided that both the gNodeB and the UE have a common understanding about which of the first to fourth bandwidth usage combinations is to be used. Alternatively, the 3GPP technical standard specifications can specify the relation between one of the four bandwidth usages with the UE category and/or service scenario. With such relationship, UEs belonging to one particular category and/or in a particular deployment scenario follow one particular bandwidth usage combination. In such way, the signaling overhead for configuration vanishes.

In a further alternative, the first to fourth bandwidth usage combinations could be extended in that indication thereof requires further information what the first, narrow bandwidth part, BP1, and what the second, wide bandwidth part, BP2, are. This is necessary, particularly, in a mobile communication system where multiple narrow bandwidth parts, and multiple wide bandwidth parts can are configured over the system bandwidth.

In this case, the further information must complement the first to fourth bandwidth usage combinations such that it knows which of the configured different narrow and wide bandwidth parts to use as the first and second bandwidth part BP1 and BP2 of the first to fourth bandwidth usage combinations. This further information can, for example, be signaled from the gNodeB to the UE in form of a downlink control information (DCI) message.

Particularly, the signaling DCI message may include an index to select the first and/or second bandwidth part BP1, BP2 from among a plurality of non-overlapping or overlapping narrow and wide bandwidth parts within the system bandwidth. Thus the semi-statically configured first to fourth bandwidth part usage combinations are also suitable for this configuration of the mobile communication system.

Advantageously, the first bandwidth part usage combination (short: first usage) always use wide bandwidth part, BP2, at the beginning of a DRX cycle. This facilitates the possible beam management procedure because wide bandwidth part can be used for better beam measurement accuracy. The first bandwidth part usage also features no bandwidth part switching over the whole communication period in a DRX cycle. This gives the advantage of eliminating the bandwidth transition overhead. However, since no power saving gain by bandwidth part adaption is possible, the first bandwidth part usage can be used when traffic characteristics are completed known and the DRX cycle is configured accurately.

By contrast, for the second to four bandwidth part usage combinations, UE always activates narrow bandwidth part, BP1, when wakes up at each DRX cycle. This can reduce the power consumption when UE wakes up unnecessarily. Therefore, the configuration of DRX cycle and OnDuration timer can be more relaxed, compared to the first usage.

Advantageously, the second bandwidth part usage combination (short: second usage) only allows narrow to wide bandwidth part switching once a scheduling assignment is detected (e.g., by a dynamic mechanism) and then maintains the wide bandwidth part for the rest of the DRX cycle. Since the wide bandwidth part can increase the peak data rate, such that the burst traffic can be served more quickly. This allows UE to get back to sleep earlier. Having a wide bandwidth part during the other time periods, such as INACTIVE time, can also provide more scheduling flexibility for the gNodeB. However, compared to the first usage, this second usage slightly increases the bandwidth part switching overhead. Nevertheless, it can beneficially be used, when traffic characteristics are not completely, but largely known.

Advantageously, the third bandwidth part usage combination (short: third usage) prioritizes the retransmissions over or same as the (initial) transmissions, depending on which dynamic mechanism is used for bandwidth part activation once the scheduling assignment is detected during TRANSMISSION duration. Therefore, it provides reliable retransmission and makes efficient use of the bandwidth at high traffic loads.

Advantageously, the fourth bandwidth part usage combination (short: fourth usage) allows more bandwidth part switching to achieve better power saving, however, at the cost of an increased switching (transition) overhead. It can be beneficially applied when the traffic characteristics are unknown and hence DRX configuration cannot be configured matching the traffic burst. With the help of the fourth bandwidth part usage, the power saving gain can still be achieved.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

According to a first aspect, a mobile terminal is suggested for communicating in a mobile communication system with a base station using at least one of a first bandwidth part and a second bandwidth part within a system bandwidth, the first bandwidth part being smaller than the second bandwidth part. The mobile terminal comprises a transceiver which, in operation, receives a configuration of a discontinuous reception, DRX, cycle; and a processor which, in operation, configures, upon reception of the configuration of the DRX cycle, a downlink communication during at least one of the communication periods within the DRX cycle to use a specific one of at least the first bandwidth part, and the second bandwidth part.

According to a second aspect, which can be combined with the first aspect, the processor of the mobile terminal, in operation, configures the downlink communication according to a bandwidth usage indication which indicates a usage of the specific one of at least the first and second bandwidth part during the at least one of the communication period within the DRX cycle.

According to a third aspect, which can be combined with the second aspect, the transceiver of the mobile terminal, in operation, receives the bandwidth usage indication via a radio resource configuration, RRC, message, a Downlink Control Information, DCI, message or a Medium Access Control, MAC, Control Element.

According to a fourth aspect, which can be combined with the second or third aspects, the transceiver of the mobile terminal, in operation, receives the bandwidth usage indication in a message also including the configuration of the DRX cycle.

According to a fifth aspect, which can be combined with the second to fourth aspect, the bandwidth usage indication indicates a usage of the specific one of at least the first and second bandwidth part during at least a TRANSMISSION duration, an INACTIVE duration, and an RETRANSMISSION duration within the DRX cycle and/or wherein the bandwidth usage indication indicates either a first usage including the second bandwidth part during the TRANSMISSION duration, the second bandwidth part during the INACTIVE duration, and the second bandwidth part during the RETRANSMISSION duration within the DRX cycle; or a second usage including the first bandwidth part during the TRANSMISSION duration, the second bandwidth part during the INACTIVE duration, and the second bandwidth part during the RETRANSMISSION duration within the DRX cycle; or a third usage including the first bandwidth part during the TRANSMISSION duration, the first bandwidth part during the INACTIVE duration, and the second bandwidth part during the RETRANSMISSION duration within the DRX cycle; or a forth usage including the first bandwidth part during the TRANSMISSION duration, the first bandwidth part during the INACTIVE duration, and the first bandwidth part during the RETRANSMISSION duration within the DRX cycle.

According to a sixth aspect, which can be combined with the first to fifth aspect, the processor of the mobile terminal, in operation, respectively configures the downlink communication during the TRANSMISSION duration or RETRANSMISSION duration to use the second bandwidth part in case the transceiver receives a downlink scheduling assignment for a downlink transmission or re-transmission, According to a seventh aspect, which can be combined with the first to sixth aspect, the processor of the mobile terminal, in operation, configures the communication during the RETRANSMISSION duration to use the same of the first and second bandwidth part, as for the downlink communication of the corresponding transmission during the TRANSMISSION duration, in case the transceiver receives a downlink scheduling assignment for a downlink re-transmission.

According to a eighth aspect, which can be combined with the third aspect, the processor of the mobile terminal, in operation, configures the communication during the corresponding of the at least one of the communication periods within the DRX cycle to use instructed specific one of at least the first bandwidth part and the second bandwidth part, in case the transceiver receives a Downlink Control Information, DCI, message including an instruction to activate the specific one of at least the first bandwidth part and the second bandwidth part during at least one of the communication periods within the DRX cycle.

According to a ninth aspect, which can be combined with the first to eighth aspect, the transceiver of the mobile terminal, in operation, receives a configuration message, optionally a Downlink Control Information, DCI, message including: an index to select the first and/or second bandwidth part from among a plurality of non-overlapping or overlapping narrow and wide bandwidth parts within the system bandwidth.

According to a tenth aspect, a base station is proposed for communicating in a mobile communication system with a mobile terminal, using at least one of a first bandwidth part, and a second bandwidth part within a system bandwidth, the first bandwidth part being smaller than the second bandwidth part. The base station comprises a transceiver which, in operation, transmits a configuration of a discontinuous reception, DRX, cycle; and a processor which, in operation, configures, upon transmission of the configuration of the DRX cycle, a downlink communication during at least one of the communication periods within the DRX cycle to use a specific one of at least the first bandwidth part, and the second bandwidth part.

According to an eleventh aspect, which can be combined with the tenth aspect, the processor of the base station, in operation, configures the downlink communication according to a bandwidth usage indication which indicates a usage of the specific one of at least the first and second bandwidth part during the at least one of the communication period within the DRX cycle.

According to a twelfth aspect, which can be combined with eleventh aspect, the transceiver of the base station, in operation, transmits the bandwidth usage indication via a radio resource configuration, RRC, message, a Downlink Control Information, DCI, message or a Medium Access Control, MAC, Control Element.

According to a thirteenth aspect, which can be combined with eleventh or twelfth aspect, the transceiver of the base station, in operation, transmits the bandwidth usage indication in a message also including the configuration of the DRX cycle.

According to a fourteenth aspect, which can be combined with the eleventh to thirteenth aspect, the bandwidth usage indication indicates a usage of the specific one of at least the first and second bandwidth part during at least a TRANSMISSION duration, an INACTIVE duration, and an RETRANSMISSION duration within the DRX cycle and/or wherein the bandwidth usage indication indicates either a first usage including the second bandwidth part during the TRANSMISSION duration, the second bandwidth part during the INACTIVE duration, and the second bandwidth part during the RETRANSMISSION duration within the DRX cycle; or a second usage including the first bandwidth part during the TRANSMISSION duration, the second bandwidth part during the INACTIVE duration, and the second bandwidth part during the RETRANSMISSION duration within the DRX cycle; or a third usage including the first bandwidth part during the TRANSMISSION duration, the first bandwidth part during the INACTIVE duration, and the second bandwidth part during the RETRANSMISSION duration within the DRX cycle; or a forth usage including the first bandwidth part during the TRANSMISSION duration, the first bandwidth part during the INACTIVE duration, and the first bandwidth part during the RETRANSMISSION duration within the DRX cycle.

According to a fifteenth aspect, which can be combined with the tenth to fourteenth aspect, the processor of the base station, in operation, respectively configures the downlink communication during the TRANSMISSION duration or RETRANSMISSION duration to use the second bandwidth part, in case the transceiver transmits a downlink scheduling assignment for a downlink transmission or re-transmission.

According to a sixteenth aspect, which can be combined with the tenth to fifteenth aspect, the processor of the base station, in operation, configures the communication during the RETRANSMISSION duration to use the same of the first and second bandwidth part, as for the downlink communication of the corresponding transmission during the TRANSMISSION duration, in case the transceiver transmits a downlink scheduling assignment for a downlink re-transmission.

According to a seventeenth aspect, which can be combined with the tenth to sixteenth aspect, the processor of the base station, in operation, configures the communication during the corresponding of the at least one of the communication periods within the DRX cycle to use instructed specific one of at least the first bandwidth part and the second bandwidth part, in case the transceiver transmits a Downlink Control Information, DCI, message including an instruction to activate the specific one of at least the first bandwidth part and the second bandwidth part during at least one of the communication periods within the DRX cycle.

According to a eighteenth aspect, which can be combined with the tenth to seventeenth aspect, the transceiver of the base station, in operation, transmits a configuration message, optionally a Downlink Control Information, DCI, message including: an index to select the first and/or second bandwidth part from among a plurality of non-overlapping or overlapping narrow and wide bandwidth parts within the system bandwidth.

According to a nineteenth aspect, an operating method for a mobile terminal is suggested to communicate in a mobile communication system with a base station using at least one of a first bandwidth part, and a second bandwidth part within a system bandwidth, the first bandwidth part being smaller than the second bandwidth part. The method comprises the steps of receiving a configuration of a discontinuous reception, DRX, cycle; and configuring, upon reception of the configuration of the DRX cycle, a downlink communication during at least one of the communication periods within the DRX cycle to use a specific one of at least the first bandwidth part and the second bandwidth part.

According to a twentieth aspect, an operating method for a base station is suggested to communicate in a mobile communication system with a mobile terminal, using at least one of a first bandwidth part, and a second bandwidth part within a system bandwidth, the first bandwidth part being smaller than the second bandwidth part. The method comprises the steps of transmitting a configuration of a discontinuous reception, DRX, cycle; and configuring, upon transmission of the configuration of the DRX cycle, a downlink communication during at least one of the communication periods within the DRX cycle to use a specific one of at least the first bandwidth part, and the second bandwidth part.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A communication apparatus for communicating with a base station comprising:
  a transceiver which, in operation, receives a first control information relating to a discontinuous reception (DRX) cycle; and
  circuitry which, in operation, configures for a downlink communication, upon reception of the first control information, at least a first bandwidth part used for a first case or a second bandwidth part used for a second case which is different from the first case, the second bandwidth part being different from the first bandwidth part.

2. The communication apparatus according to claim 1, wherein a specific one of at least the first bandwidth part or the second bandwidth part is indicated by a second control information via a downlink control information (DCI) at a same time of the reception of the first control information.

3. The communication apparatus according to claim 1, wherein a specific one of at least the first bandwidth part or the second bandwidth part is indicated by a second control information via a radio resource configuration (RRC) message, a downlink control information (DCI), or a medium access control (MAC) control element.

4. The communication apparatus according to claim 2, wherein the specific one of at least the first bandwidth part or the second bandwidth part is used for a TRANSMISSION duration and a corresponding RETRANSMISSION duration of the downlink communication.

5. The communication apparatus according to claim 3, wherein the specific one of at least the first bandwidth part or the second bandwidth part is used for a TRANSMISSION duration and a corresponding RETRANSMISSION duration of the downlink communication.

6. A base station for communicating with a communication apparatus comprising:
a transceiver which, in operation, transmits a first control information relating to a discontinuous reception (DRX) cycle; and
circuitry which, in operation, configures for a downlink communication, upon transmission of the first control information, at least a first bandwidth part used for a first case and a second bandwidth part used for a second case which is different from the first case, the second bandwidth part being different from the first bandwidth part.

7. The base station according to claim 6, wherein a specific one of at least the first bandwidth part or the second bandwidth part is indicated by a second control information via a downlink control information (DCI) at a same time of the transmission of the first control information.

8. The base station according to claim 6, wherein a specific one of at least the first bandwidth part or the second bandwidth part is indicated by a second control information via a radio resource configuration (RRC) message, a downlink control information (DCI), or a medium access control (MAC) control element.

9. The base station according to claim 7, wherein the specific one of at least the first bandwidth part or the second bandwidth part is used for a TRANSMISSION duration and a corresponding RETRANSMISSION duration of the downlink communication.

10. The base station according to claim 8, wherein the specific one of at least the first bandwidth part or the second bandwidth part is used for a TRANSMISSION duration and a corresponding RETRANSMISSION duration of the downlink communication.

11. A communication method performed by a communication apparatus comprising:
receiving a first control information relating to a discontinuous reception (DRX) cycle; and
configuring for a downlink communication, upon reception of the first control information, at least a first bandwidth part used for a first case and a second bandwidth part used for a second case which is different from the first case, the second bandwidth part being different from the first bandwidth part.

12. The communication method according to claim 11, wherein a specific one of at least the first bandwidth part or the second bandwidth part is indicated by a second control information via a downlink control information (DCI) at a same time of the reception of the first control information.

13. The communication method according to claim 11, wherein a specific one of at least the first bandwidth part or the second bandwidth part is indicated by a second control information via a radio resource configuration (RRC) message, a downlink control information (DCI), or a medium access control (MAC) control element.

14. The communication method according to claim 12, wherein the specific one of at least the first bandwidth part or the second bandwidth part is used for a TRANSMISSION duration and a corresponding RETRANSMISSION duration of the downlink communication.

15. The communication method according to claim 13, wherein the specific one of at least the first bandwidth part or the second bandwidth part is used for a TRANSMISSION duration and a corresponding RETRANSMISSION duration of the downlink communication.

16. A communication method performed by a base station comprising:
transmitting a first control information relating to a discontinuous reception (DRX) cycle; and
configuring for a downlink communication, upon transmission of the first control information, at least a first bandwidth part used for a first case and a second bandwidth part used for a second case which is different from the first case, the second bandwidth part being different from the first bandwidth part.

17. The communication method according to claim 16, wherein a specific one of at least the first bandwidth part or the second bandwidth part is indicated by a second control information via a downlink control information (DCI) at a same time of the transmission of the first control information.

18. The communication method according to claim 16, wherein a specific one of at least the first bandwidth part or the second bandwidth part is indicated by a second control information via a radio resource configuration (RRC) message, a downlink control information (DCI), or a medium access control (MAC) control element.

19. The communication method according to claim 17, wherein the specific one of at least the first bandwidth part or the second bandwidth part is used for a TRANSMISSION duration and a corresponding RETRANSMISSION duration of the downlink communication.

20. The communication method according to claim 18, wherein the specific one of at least the first bandwidth part or the second bandwidth part is used for a TRANSMISSION duration and a corresponding RETRANSMISSION duration of the downlink communication.

21. The communication apparatus according to claim 1, wherein each frequency position of the first bandwidth part and the second bandwidth part is indicated by a third control information.

22. The communication apparatus according to claim 2, wherein each frequency position of the first bandwidth part and the second bandwidth part is indicated by a third control information.

23. The communication apparatus according to claim 3, wherein each frequency position of the first bandwidth part and the second bandwidth part is indicated by a third control information.

24. The communication apparatus according to claim 4, wherein each frequency position of the first bandwidth part and the second bandwidth part is indicated by a third control information.

25. The base station according to claim 6, wherein each frequency position of the first bandwidth part and the second bandwidth part is indicated by a third control information.

26. The base station according to claim 7, wherein each frequency position of the first bandwidth part and the second bandwidth part is indicated by a third control information.

27. The base station according to claim 8, wherein each frequency position of the first bandwidth part and the second bandwidth part is indicated by a third control information.

28. The base station according to claim 9, wherein each frequency position of the first bandwidth part and the second bandwidth part is indicated by a third control information.

\* \* \* \* \*